US008487923B2

(12) United States Patent
Kimura

(10) Patent No.: US 8,487,923 B2
(45) Date of Patent: Jul. 16, 2013

(54) SEMICONDUCTOR DEVICE AND DRIVING METHOD THEREOF, AND ELECTRONIC DEVICE

(75) Inventor: Hajime Kimura, Kanagawa (JP)

(73) Assignee: Semiconductor Energy Laboratory Co., ltd., Kanagawa-ken (JP)

( * ) Notice: Subject to any disclaimer, the term of this patent is extended or adjusted under 35 U.S.C. 154(b) by 774 days.

(21) Appl. No.: 12/712,479

(22) Filed: Feb. 25, 2010

(65) Prior Publication Data

US 2010/0220092 A1 Sep. 2, 2010

(30) Foreign Application Priority Data

Feb. 27, 2009 (JP) ................................ 2009-045603

(51) Int. Cl.
*G06F 3/038* (2006.01)

(52) U.S. Cl.
USPC .............................. 345/212; 345/92; 345/213

(58) Field of Classification Search
USPC ....................... 345/76–80, 90–100, 204–215; 315/169.1–169.4
See application file for complete search history.

(56) References Cited

U.S. PATENT DOCUMENTS 6,909,242 B2 6/2005 Kimura
7,173,590 B2 2/2007 Uchino et al.
7,202,863 B2 * 4/2007 Kimura et al. ................ 345/204
7,345,657 B2 * 3/2008 Kimura ........................... 345/76
7,365,713 B2 4/2008 Kimura
7,414,599 B2 8/2008 Chung et al.
7,429,985 B2 9/2008 Kimura et al.
7,456,810 B2 11/2008 Kimura
7,463,223 B2 * 12/2008 Kimura ........................... 345/76
7,492,338 B2 * 2/2009 Yamazaki et al. .............. 345/83
7,674,650 B2 3/2010 Akimoto et al.
7,714,813 B2 5/2010 Uchino et al.
2003/0090481 A1 5/2003 Kimura
2006/0176250 A1 8/2006 Nathan et al.

(Continued)

FOREIGN PATENT DOCUMENTS

JP 2003/202833 A 7/2003
JP 2003/216110 A 7/2003

(Continued)

OTHER PUBLICATIONS

Taro Hasumi et al.; "46.2: New OLED Pixel Circuit and Driving Method to Suppress Threshold Voltage Shift of a-Si:H TFT"; SID DIGEST '06 : SID International Symposium Digest of Technical Papers; vol. 37; Jun. 6, 2006; pp. 1547-1550.

*Primary Examiner* — Vijay Shankar
(74) *Attorney, Agent, or Firm* — Fish & Richardson P.C.

(57) ABSTRACT

A driving method of a semiconductor device for compensating variation in threshold voltage and mobility of a transistor is provided. A driving method of a semiconductor device including a transistor and a capacitor electrically connected to a gate of the transistor includes a first period where voltage corresponding to threshold voltage of the transistor is held in the capacitor, a second period where a total voltage of video signal voltage and threshold voltage is held in the capacitor holding the threshold voltage, and a third period where charge held in the capacitor in accordance with the total voltage of the video signal voltage and the threshold voltage in the second period is discharged through the transistor.

17 Claims, 19 Drawing Sheets

U.S. PATENT DOCUMENTS

| | | | |
|---|---|---|---|
| 2007/0103419 | A1 | 5/2007 | Uchino et al. |
| 2007/0115225 | A1 | 5/2007 | Uchino et al. |
| 2007/0132694 | A1 | 6/2007 | Uchino et al. |
| 2007/0164962 | A1 | 7/2007 | Uchino et al. |
| 2007/0210720 | A1 | 9/2007 | Kimura |
| 2007/0247398 | A1 | 10/2007 | Nathan et al. |
| 2007/0268210 | A1 | 11/2007 | Uchino et al. |
| 2009/0009676 | A1 | 1/2009 | Kimura et al. |
| 2009/0225010 | A1 | 9/2009 | Kimura |

FOREIGN PATENT DOCUMENTS

| | | | |
|---|---|---|---|
| JP | 2005-031630 | A | 2/2005 |
| JP | 2005-345722 | A | 12/2005 |
| JP | 2007-148128 | A | 6/2007 |
| JP | 2007-148129 | A | 6/2007 |
| JP | 2007-310311 | A | 11/2007 |
| WO | 2006/060902 | A1 | 6/2006 |

* cited by examiner

SEMICONDUCTOR DEVICE AND DRIVING METHOD THEREOF, AND ELECTRONIC DEVICE

BACKGROUND OF THE INVENTION

1. Field of the Invention

The present invention relates to a semiconductor device, a display device, or a light-emitting device, or a driving method thereof.

2. Description of the Related Art

Flat panel displays such as liquid crystal displays (LCD) become widely used in recent years. However, LCDs have various drawbacks such as a narrow viewing angle, narrow chromaticity range, and slow response speed. Thus, to overcome those drawbacks, research of an organic EL (also referred to as an electroluminescence, an organic light-emitting diode, an OLED, or the like) displays have been actively conducted (Patent Document 1).

However, organic EL displays have a problem in which current characteristics of transistors for controlling current which flows into organic EL elements vary from pixel to pixel. When current flowing into the organic EL elements (that is, current flowing into the transistors) varies, luminance of the organic EL elements also varies, whereby display screens display images with unevenness. Thus, methods for compensating variation in threshold voltage of transistors have been examined (Patent Documents 2 to 6).

However, even if variation in the threshold voltage of the transistors is compensated, variation in mobility of the transistors also leads to variation in current flowing into an organic EL element, so that image unevenness occurs. Thus, methods for compensating not only the threshold voltage but also variation in mobility of transistors have been examined (Patent Documents 7 and 8).

REFERENCE

[Patent Document 1] Japanese Published Patent Application No. 2003-216110
[Patent Document 2] Japanese Published Patent Application No. 2003-202833
[Patent Document 3] Japanese Published Patent Application No. 2005-31630
[Patent Document 4] Japanese Published Patent Application No. 2005-345722
[Patent Document 5] Japanese Published Patent Application No. 2007-148129
[Patent Document 6] International Publication No. WO2006/060902
[Patent Document 7] Japanese Published Patent Application No. 2007-148128 (paragraph 0098)
[Patent Document 8] Japanese Published Patent Application No. 2007-310311 (paragraph 0026)

SUMMARY OF THE INVENTION

In techniques disclosed in Patent Documents 7 and 8, variation in mobility of a transistor is compensated while an image signal (a video signal) is input to a pixel, so that problems occur.

For example, since variation in mobility of a transistor is compensated while an image signal is input to a pixel, an image signal cannot be input to another pixel during the compensation. In general, the number of the pixels, the number of frame frequencies, screen size, and/or the like determine the maximum length of the period in which the image signal is input to each pixel (so-called, one gate selection period or one horizontal period). Therefore, if the period for compensating variation in mobility increases in one gate selection period, periods of other processes (input of an image signal, acquisition of threshold voltage, or the like) are shortened. Therefore, various processes need to be performed in one gate selection period in a pixel. As a result, accurate processes cannot be performed because of lack of processing period, or compensation of variation in mobility is insufficient because the period in which variation in mobility is compensated is insufficient.

Further, one gate selection period per one pixel becomes shorter as the number of the pixels and frame frequencies increase, or as the screen size increases. Therefore, input of an image signal to the pixel, compensation of variation in mobility, or the like cannot be performed sufficiently.

Alternatively, in the case where variation in mobility is compensated while an image signal is input, such compensation of variation in mobility is easily affected by distortion of the waveform of the image signal. Therefore, the degree of compensation of mobility varies between the cases where distortion of the waveform of the image signal is large and where distortion of the waveform of the image signal is small. Accordingly, accurate compensation is impossible.

Alternatively, in the case where variation in mobility is compensated while an image signal is input to a pixel, it is difficult to perform dot sequential driving in many cases. In dot sequential driving, when an image signal is input to a pixel of a specific row, an image signal is input not to all the pixels of the row at a time but to the pixels one by one. Thus, the length of the period in which an image signal is input varies from one pixel to another pixel. Therefore, when variation in mobility is compensated while an image signal is input, the length of the period for compensating variation in mobility varies from one pixel to another pixel, so that the amount of compensation also varies from one pixel to another pixel. Thus, compensation cannot be normally performed. Therefore, in the case where variation in mobility is compensated while an image signal is input, line sequential driving is needed in which a signal is input to all pixels of the row at a time, not dot sequential driving.

Furthermore, in line sequential driving, the structure of a source signal line driver circuit (also referred to as a video signal line driver circuit, a source driver, or a data driver) is more complicated than that in dot sequential driving. For example, for the source signal line driver circuit in line sequential driving, a circuit such as a DA converter, an analog buffer, or a latch circuit is needed in many cases. However, the analog buffer includes an operational amplifier, a source follower circuit, or the like in many cases and is easily influenced by variation in current characteristics of a transistor. Thus, when a circuit is configured using a TFT (a thin film transistor), a circuit compensating variation in current characteristics of a transistor is necessary. Accordingly, the scale of a circuit and power consumption is increased. Therefore, when a TFT is used as a transistor for a pixel portion, there can be difficulty in forming the pixel portion and the signal line driver circuit over the same substrate. Therefore, the signal line driver circuit is necessarily formed by using a different means from that of the pixel portion. Thus, the cost may rise. Furthermore, the pixel portion and the signal line driver circuit are necessarily connected using COG (chip on glass), TAB (tape automated bonding), or the like, so that a contact failure may be generated, reliability may be degraded, for example.

Then, it is an object of an embodiment of the present invention to reduce adverse effects of variation in threshold voltage of a transistor. Alternatively, it is an object of an embodiment of the present invention to reduce influence of variation in mobility of a transistor. Alternatively, it is an object of an embodiment of the present invention to reduce influence of variation of current characteristic of a transistor. Alternatively, it is an object of an embodiment of the present invention to ensure a long input period of an image signal. Alternatively, it is an object of an embodiment of the present invention to obtain a long compensation period for reducing influence of variation in threshold voltage. Alternatively, it is an object of an embodiment of the present invention to obtain a long compensation period to reduce influence of variation in mobility. Alternatively, it is an object of an embodiment of the present invention to prevent distortion of the waveform of the image signal from influencing compensation for variation in mobility. Alternatively, it is an object of an embodiment of the present invention to enable use of not only line sequential driving but also dot sequential driving. Alternatively, it is an object of an embodiment of the present invention to form a pixel and a driver circuit on the same substrate. Alternatively, it is an object of an embodiment of the present invention to reduce electric power consumption. Alternatively, it is an object of an embodiment of the present invention to reduce manufacturing costs. Alternatively, it is an object of an embodiment of the present invention to reduce the possibility of causing a contact failure at a connection portion of wirings. Note that description of these objects does not preclude the existence of another object. Note that an embodiment of the present invention does not have to attain all the above objects.

An embodiment of the invention is a driving method of a semiconductor device including a transistor and a capacitor electrically connected to a gate of the transistor. The driving method of a semiconductor device includes a first period where voltage corresponding to threshold voltage of the transistor is held in the capacitor, a second period where total voltage of video signal voltage and threshold voltage is held in the capacitor holding the threshold voltage, and a third period where charge held in the capacitor according to the total voltage of video signal voltage and threshold voltage in the second period is discharged through the transistor.

An embodiment of the invention is a driving method of a semiconductor device including a transistor and a capacitor electrically connected to a gate of the transistor. The driving method of a semiconductor device includes a first period where charge held in the capacitor is initialized, a second period where voltage corresponding to threshold voltage of the transistor is held in the capacitor, a third period where total voltage of video signal voltage and threshold voltage is held in the capacitor holding the threshold voltage, and a fourth period where charge held in the capacitor according to the total voltage of video signal voltage and threshold voltage in the third period is discharged through the transistor.

An embodiment of the invention is a driving method of a semiconductor device including a transistor, a capacitor electrically connected to a gate of the transistor, and a display element. The driving method of a semiconductor device includes a first period where voltage corresponding to threshold voltage of the transistor is held in the capacitor, a second period where total voltage of video signal voltage and the threshold voltage are held in the capacitor holding the threshold voltage, a third period where charge held in the capacitor according to the total voltage of the video signal voltage and the threshold voltage in the second period is discharged through the transistor, and a fourth period where current is supplied to the display element through the transistor after the third period.

An embodiment of the invention is a driving method of a semiconductor device including a transistor, a capacitor electrically connected to a gate of the transistor, and a display element. The driving method of a semiconductor device includes a first period where charge held in the capacitor is initialized, a second period where voltage corresponding to threshold voltage of the transistor held in the capacitor, a third period where total voltage of video signal voltage and the threshold voltage is held in the capacitor holding the threshold voltage, a fourth period where charge held in the capacitor according to the total voltage of the video signal voltage and the threshold voltage in the third period is discharged through the transistor, and a fifth period where current is supplied to the display element through the transistor after the third period.

Note that a variety of switches can be used as the switch. For example, an electrical switch or a mechanical switch can be used. That is, any element can be used as long as it can control a current flow, without limitation on a certain element. For example, a transistor (e.g., a bipolar transistor or a MOS transistor), or a diode (e.g., a PN diode, a PIN diode, a Schottky diode, an MIM (metal insulator metal) diode, an MIS (metal insulator semiconductor) diode, or a diode-connected transistor) can be used as the switch. Alternatively, a logic circuit in which such elements are combined can be used as the switch.

An example of a mechanical switch is a switch formed using a MEMS (micro electro mechanical system) technology, such as a digital micromirror device (DMD). Such a switch includes an electrode which can be moved mechanically, and operates by controlling conduction and non-conduction in accordance with movement of the electrode.

Note that a CMOS switch may be used as the switch by using both an n-channel transistor and a p-channel transistor.

Note that when it is explicitly described that "A and B are connected", the case where A and B are electrically connected, the case where A and B are functionally connected, and the case where A and B are directly connected are included therein. Here, each of A and B is an object (e.g., a device, an element, a circuit, a wiring, an electrode, a terminal, a conductive film, or a layer). Accordingly, another element may be provided between elements having a connection relation illustrated in drawings and texts, without limitation on a predetermined connection relation, for example, the connection relation illustrated in the drawings and the texts.

For example, in the case where A and B are electrically connected, one or more elements which enable electrical connection between A and B (e.g., a switch, a transistor, a capacitor, an inductor, a resistor, and/or a diode) may be connected between A and B. In the case where A and B are functionally connected, one or more circuits which enable functional connection between A and B (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a dc-dc converter, a step-up dc-dc converter, or a step-down dc-dc converter) or a level shifter circuit for changing a potential level of a signal; a voltage source; a current source; a switching circuit; an amplifier circuit such as a circuit which can increase signal amplitude, the amount of current, or the like, an operational amplifier, a differential amplifier circuit, a source follower circuit, or a buffer circuit; a signal generation circuit; a memory circuit; and/or a control circuit) may be connected between A and B. For example, in the case where a signal output from A is transmitted to B even when another circuit is provided between A and B, A and B are functionally connected.

Note that when it is explicitly described that "A and B are electrically connected", the case where A and B are electrically connected (i.e., the case where A and B are connected with another element or another circuit therebetween), the case where A and B are functionally connected (i.e., the case where A and B are functionally connected with another circuit therebetween), and the case where A and B are directly connected (i.e., the case where A and B are connected without another element or another circuit therebetween) are included therein. That is, when it is explicitly described, "A and B are electrically connected", the description is the same as the case where it is explicitly described only, "A and B are connected".

Note that a display element, a display device which is a device including a display element, a light-emitting element, and a light-emitting device which is a device including a light-emitting element can employ a variety of modes and include a variety of elements. For example, a display element, a display device, a light-emitting element, and a light-emitting device can include a display medium whose contrast, luminance, reflectivity, transmittance, or the like changes by electromagnetic action, such as an EL (electroluminescence) element (e.g., an EL element containing organic and inorganic materials, an organic EL element, or an inorganic EL element), an LED (e.g., a white LED, a red LED, a green LED, or a blue LED), a transistor (a transistor which emits light depending on the amount of current), an electron emitter, a liquid crystal element, electronic ink, an electrophoretic element, a grating light valve (GLV), a plasma display (PDP), a digital micromirror device (DMD), a piezoelectric ceramic display, or a carbon nanotube. Note that display devices using an EL element include an EL display; display devices using an electron emitter include a field emission display (FED) and an SED (surface-conduction electron-emitter display) flat panel display; display devices using a liquid crystal element include a liquid crystal display (e.g., a transmissive liquid crystal display, a transflective liquid crystal display, a reflective liquid crystal display, a direct-view liquid crystal display, or a projection liquid crystal display); and display devices using electronic ink or an electrophoretic element included in electronic paper in their respective categories.

A liquid crystal element is an element that controls transmission or non-transmission of light by an optical modulation action of liquid crystal, and includes a pair of electrodes and liquid crystal. Note that, the optical modulation action of liquid crystal is controlled by an electric field (including a lateral electric field, a vertical electric field, and a diagonal electric field) applied to the liquid crystal. The following liquid crystal can be used for a liquid crystal element: nematic liquid crystal, cholesteric liquid crystal, smectic liquid crystal, discotic liquid crystal, thermotropic liquid crystal, lyotropic liquid crystal, low molecular liquid crystal, high molecular liquid crystal, polymer dispersed liquid crystal (PDLC), ferroelectric liquid crystal, anti-ferroelectric liquid crystal, main chain type liquid crystal, side chain type polymer liquid crystal, plasma addressed liquid crystal (PALC), and banana-shaped liquid crystal. Moreover, the following methods can be used for driving the liquid crystal, for example: a TN (twisted nematic) mode, an STN (super twisted nematic) mode, an IPS (in-plane-switching) mode, an FFS (fringe field switching) mode, an MVA (multi-domain vertical alignment) mode, a PVA (patterned vertical alignment) mode, an ASV (advanced super view) mode, an ASM (axially symmetric aligned microcell) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a guest-host mode, and a blue phase mode. Note that various kinds of liquid crystal elements and driving methods can be used without limitation on those described above.

As a transistor, a variety of transistors can be used. There is no limitation on the type of transistors. For example, a thin film transistor (TFT) including a non-single-crystal semiconductor film typified by a film made of amorphous silicon, polycrystalline silicon, microcrystalline (also referred to as microcrystal, nanocrystal, or semi-amorphous) silicon, or the like can be used.

Note that by using a catalyst (e.g., nickel) in the case of forming polycrystalline silicon, crystallinity can further be improved and a transistor having excellent electrical characteristics can be formed. Further, by using a catalyst (e.g., nickel) in the case of forming microcrystalline silicon, crystallinity can further be improved and a transistor having excellent electric characteristics can be formed. Note that it is possible to form polycrystalline silicon and microcrystalline silicon without using a catalyst (e.g., nickel).

The crystallinity of silicon is preferably enhanced to polycrystallinity or microcrystallinity in the entire panel, but not limited thereto. The crystallinity of silicon may be improved only in part of the panel.

Alternatively, a transistor can be formed by using a semiconductor substrate, an SOI substrate, or the like.

Alternatively, a transistor including a compound semiconductor or an oxide semiconductor, such as ZnO, a-InGaZnO, SiGe, GaAs, IZO, ITO, SnO, TiO, or AlZnSnO (AZTO) and a thin film transistor or the like obtained by thinning such a compound semiconductor or oxide semiconductor can be used. Note that such a compound semiconductor or oxide semiconductor can be used for not only a channel portion of a transistor but also for other applications. For example, such a compound semiconductor or oxide semiconductor can be used for a resistor, a pixel electrode, or a light-transmitting electrode. Further, since such an element can concurrently be formed the transistor, the costs can be reduced.

A transistor or the like formed by an inkjet method or a printing method can also be used.

Further, a transistor or the like including an organic semiconductor or a carbon nanotube can be used. Accordingly, such a transistor can be formed over a flexible substrate. A semiconductor device using such a substrate can resist a shock.

In addition, various types of transistors can be used. For example, a MOS transistor, a junction transistor, a bipolar transistor, or the like can be used as a transistor.

Further, a MOS transistor, a bipolar transistor, and/or the like may be formed over one substrate.

Furthermore, various transistors other than the above transistors can be used.

A transistor can be formed using various types of substrates. The type of a substrate is not limited to a certain type. As the substrate, a single crystalline substrate (e.g., a silicon substrate), an SOI substrate, a glass substrate, a quartz substrate, a plastic substrate, a metal substrate, a stainless steel substrate, a substrate including a stainless steel foil, a tungsten substrate, a substrate including a tungsten foil, or a flexible substrate can be used, for example. Examples of the glass substrate are barium borosilicate glass and aluminoborosilicate glass. Examples of the flexible substrate are flexible synthetic resin such as plastics typified by polyethylene terephthalate (PET), polyethylene naphthalate (PEN), and polyethersulfone (PES), and acrylic. Alternatively, an attachment film (formed using polypropylene, polyester, vinyl, polyvinyl fluoride, polyvinyl chloride, or the like), paper including a fibrous material, a base material film (polyester, polyamide, polyimide, an inorganic vapor deposition film, paper, or the like), or the like can be used. Alternatively, the transistor may be formed using one substrate, and then, the transistor may be transferred and disposed to another substrate. As a substrate to which the transistor is transferred, a single crystal substrate, an SOI substrate, a glass substrate, a quartz substrate, a plastic substrate, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, a stainless steel substrate, a substrate including a stainless steel foil, or the like can be used. A skin (e.g., epidermis or corium) or hypodermal tissue of an animal such as a human being can be used as a substrate to which the transistor is transferred. Alternatively, the transistor may be formed using one substrate and the substrate may be thinned by polishing. As a substrate to be polished, a single crystal substrate, an SOI substrate, a glass substrate, a quartz substrate, a plastic substrate, a stainless steel substrate, a substrate including a stainless steel foil, or the like can be used. By using such a substrate, a transistor with excellent properties or low power consumption can be formed, a device with high durability or high heat resistance can be provided, or reduction in weight or thickness can be achieved.

Note that the structure of a transistor can be a variety of structures, without limitation on a certain structure. For example, a multi-gate structure having two or more gate electrodes can be used.

As another example, a structure where gate electrodes are formed above and below a channel can be used. Note that when the gate electrodes are formed above and below the channel, a structure where a plurality of transistors are connected in parallel is provided.

A structure where a gate electrode is formed above a channel region, a structure where a gate electrode is formed below a channel region, a staggered structure, an inverted staggered structure, a structure where a channel region is divided into a plurality of regions, or a structure where channel regions are connected in parallel or in series can be used. Moreover, a structure where a source electrode or a drain electrode overlaps with a channel region (or part thereof) can be used.

Note that a variety of transistors can be used, and the transistor can be formed using a variety of substrates. Accordingly, all the circuits which are necessary to realize a predetermined function can be formed using one substrate. For example, all the circuits which are necessary to realize the predetermined function can be formed using a glass substrate, a plastic substrate, a single crystal substrate, an SOI substrate, or any other substrate. Alternatively, some of the circuits which are necessary to realize the predetermined function can be formed using one substrate and some of the circuits which are necessary to realize the predetermined function can be formed using another substrate. That is, not all the circuits which are necessary to realize the predetermined function need to be formed using one substrate. For example, some of the circuits which are necessary to realize the predetermined function can be formed by transistors using a glass substrate, some of the circuits which are necessary to realize the predetermined function can be formed using a single crystal substrate, and an IC chip including transistors formed using the single crystal substrate can be connected to the glass substrate by COG (chip on glass) so that the IC chip is provided over the glass substrate. Alternatively, the IC chip can be connected to the glass substrate by TAB (tape automated bonding) or with a printed wiring board.

Note that a transistor is an element having at least three terminals of a gate, a drain, and a source. The transistor has a channel region between a drain region and a source region, and current can flow through the drain region, the channel region, and the source region. Here, since the source and the drain of the transistor change depending on the structure, the operating condition, and the like of the transistor, it is difficult to define which is a source or a drain. Thus, a region which serves as a source or a drain is not referred to as a source or a drain in some cases. In such a case, one of the source and the drain may be referred to as a first terminal and the other of the source and the drain may be referred to as a second terminal, for example. Alternatively, one of the source and the drain may be referred to as a first electrode and the other of the source and the drain may be referred to as a second electrode. Further alternatively, one of the source and the drain may be referred to as a first region and the other of the source and the drain may be referred to as a second region.

Note that a transistor may be an element having at least three terminals of a base, an emitter, and a collector. In this case also, the emitter and the collector may be referred to as a first terminal and a second terminal, for example.

Note that when it is explicitly described that B is formed on or over A, it does not necessarily mean that B is formed in direct contact with A. The description includes the case where A and B are not in direct contact with each other, that is, the case where another object is placed between A and B. Here, each of A and B is an object (e.g., a device, an element, a circuit, a wiring, an electrode, a terminal, a conductive film, or a layer).

Accordingly, for example, when it is explicitly described that a layer B is formed on (or over) a layer A, it includes both the case where the layer B is formed in direct contact with the layer A; and the case where another layer (e.g., a layer C or a layer D) is formed in direct contact with the layer A, and the layer B is formed in direct contact with the layer C or the layer D. Note that another layer (e.g., the layer C or the layer D) may be a single layer or a plurality of layers.

Similarly, when it is explicitly described that B is formed above A, it does not necessarily mean that B is formed in direct contact with A, and another object may be placed between A and B. Accordingly, the case where a layer B is formed above a layer A includes the case where the layer B is formed in direct contact with the layer A and the case where another layer (e.g., a layer C and a layer D) is formed in direct contact with the layer A and the layer B is formed in direct contact with the layer C or the layer D. Note that another layer (e.g., the layer C or the layer D) may be a single layer or a plurality of layers.

Note that when it is explicitly described that B is formed over, on, or above A, it includes the case where B is formed obliquely over/above A.

Note that the same can be said when it is explicitly described that B is formed below or under A.

Note that when an object is explicitly described in a singular form, the object is preferably singular. However, embodiments of the present invention are not limited thereto, and such singular forms can include plural forms. Similarly, explicit plural forms preferably mean plural forms. However, embodiments of the present invention are not limited thereto, and such plural forms can include singular forms.

Note that the size, the thickness of layers, or regions in diagrams are sometimes exaggerated for simplicity. Therefore, embodiments of the present invention are not limited to such scales.

Note that a diagram schematically illustrates an ideal example, and embodiments of the present invention are not limited to the shape or the value illustrated in the diagram. For example, the following can be included: variation in shape due to a manufacturing technique or dimensional deviation; or variation in signal, voltage, or current due to noise or difference in timing.

Technical terms are used in order to describe a specific embodiment or the like in many cases. Note that interpretation in an embodiment of the invention should not be limited on terms.

Note that terms which are not defined (including terms used for science and technology, such as technical terms and academic parlance) can be used as the terms which have a meaning equivalent to a general meaning that an ordinary person skilled in the art understands. It is preferable that the term defined by dictionaries or the like is construed as a consistent meaning with the background of related art.

The terms such as first, second, and third are used for distinguishing various elements, members, regions, layers, and areas from others. Therefore, the terms such as first, second, and third do not limit the number of elements, members, regions, layers, areas, or the like. Further, for example, "first" can be replaced with "second", "third", or the like.

Terms for describing spatial arrangement, such as "over", "above", "under", "below", "laterally", "right", "left", "obliquely", "back", "front", "inside", "outside", and "in", are often used for briefly showing, with reference to a diagram, a relation between an element and another element or between some characteristics and other characteristics. Note that embodiments of the present invention are not limited thereto, and such terms for describing spatial arrangement can indicate not only the direction illustrated in a diagram but also another direction. For example, when it is explicitly described that "B is over A", it does not necessarily mean that B is placed over A, and can include the case where B is placed under A because a device in a diagram can be inverted or rotated by 180°. Accordingly, "over" can refer to the direction described by "under" in addition to the direction described by "over". Note that embodiments of the present invention are not limited thereto, and "over" can refer to other directions described by "laterally", "right", "left", "obliquely", "back", "front", "inside", "outside", and "in", in addition to the directions described by "over" and "under" because a device in a diagram can be rotated in a variety of directions. That is, terms for describing spatial arrangement can be appropriately construed as circumstances demand.

An embodiment of the present invention can reduce influence of variation in threshold voltage of a transistor. Alternatively, an embodiment of the present invention can reduce influence of variation in mobility of a transistor. Alternatively, an embodiment of the present invention can reduce influence of variation of current characteristic of a transistor. Alternatively, an embodiment of the present invention can obtain a long inputting period of an image signal. Alternatively, an embodiment of the present invention can obtain a long compensation period for reducing influence of variation in threshold voltage. Alternatively, an embodiment of the present invention can obtain a long compensation period for reducing influence of variation in mobility. Alternatively, an embodiment of the present invention can prevent distortion of waveform of an image signal from influencing compensation for variation in mobility. Alternatively, an embodiment of the present invention can perform not only line sequential driving but also dot sequential driving. Alternatively, an embodiment of the present invention can form a pixel and a driver circuit over one substrate. Alternatively, an embodiment of the present invention can reduce power consumption. Alternatively, an embodiment of the present invention can reduce manufacturing costs. Alternatively, an embodiment of the present invention can reduce a contact failure at a connection portion of wirings.

BRIEF DESCRIPTION OF THE DRAWINGS

In the accompanying drawings:

FIGS. 16A to 16E are cross sectional views each illustrating a transistor shown in an embodiment;

DETAILED DESCRIPTION OF THE INVENTION

Figure 1A:
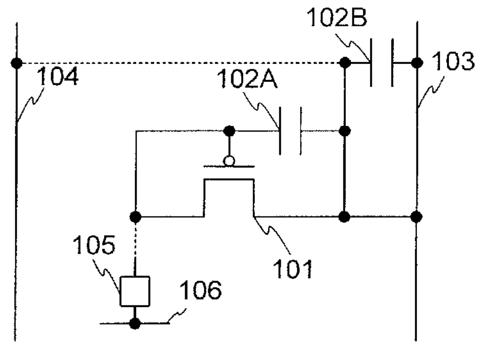
FIGS. 1A to 1C are diagrams illustrating a circuit or a driving method shown in embodiment.

Hereinafter, embodiments will be described with reference to the drawings. Note that the embodiments can be implemented in various ways and it will be readily appreciated by those skilled in the art that modes and details of the embodiments can be changed in various ways without departing from the spirit and scope of the present invention. Therefore, the present invention should not be construed as being limited to the following description of the embodiments. Note that in structures described below, the same portions or portions having similar functions are denoted by common reference numerals in different drawings, and description thereof is not repeated.

Further, a content (or may be part of the content) described in one embodiment may be applied to, combined with, or replaced by a different content (or may be part of the different content) described in the embodiment and/or a content (or may be part of the content) described in one or a plurality of different embodiments.

Note that in each embodiment, a content described in the embodiment is a content described with reference to a variety of diagrams or a content described with a text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in one or a plurality of different embodiments, much more diagrams can be formed.

Note that in a diagram or a text described in one embodiment, part of the diagram or the text is taken out, and one embodiment of the invention can be constituted. Thus, in the case where a diagram or a text related to a certain portion is described, the context taken out from part of the diagram or the text is also disclosed as one embodiment of the invention, and one embodiment of the invention can be constituted. Therefore, for example, in a diagram (e.g., a cross-sectional view, a plan view, a circuit diagram, a block diagram, a flow chart, a process diagram, a perspective view, a cubic diagram, a layout diagram, a timing chart, a structure diagram, a schematic view, a graph, a list, a ray diagram, a vector diagram, a phase diagram, a waveform chart, a photograph, or a chemical formula) or a text in which one or more active elements (e.g., transistors or diodes), wirings, passive elements (e.g., capacitors or resistors), conductive layers, insulating layers, semiconductor layers, organic materials, inorganic materials, components, substrates, modules, devices, solids, liquids, gases, operating methods, manufacturing methods, or the like are described, part of the diagram or the text is taken out, and one embodiment of the invention can be constituted. For example, M pieces of circuit elements (e.g., transistors or capacitors) (M is an integer, where M<N) are taken out from a circuit diagram in which N pieces of circuit elements (e.g., transistors or capacitors) (N is an integer) are provided, and one embodiment of the invention can be constituted. As another example, M pieces of layers (M is an integer, where M<N) are taken out from a cross-sectional view in which N pieces of layers (N is an integer) are provided, and one embodiment of the invention can be constituted. As another example, M pieces of elements (M is an integer, where M<N) are taken out from a flow chart in which N pieces of elements (N is an integer) are provided, and one embodiment of the invention can be constituted.

Embodiment 1

Figure 1B:
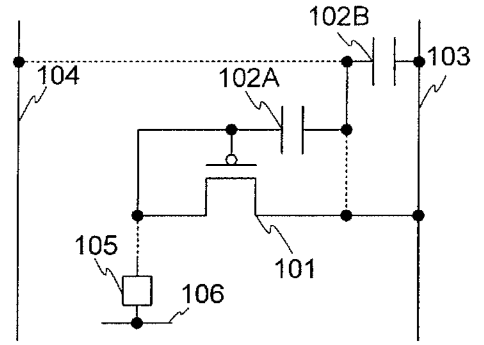
Figure 1C:
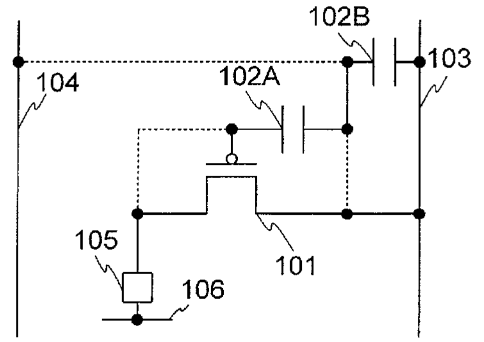

FIGS. 1A to 1C show an example of a driving method, driving timing, and a circuit structure in the case of compensating variation in current characteristics such as threshold voltage of a transistor or mobility. Note that in this embodiment, description is made about a transistor having p-type conductivity as an example.

A circuit structure in the period for compensating variation in threshold voltage of a transistor 101 is shown in FIG. 1A. That is, a circuit structure in the period in which a capacitor holds charge corresponding to the threshold voltage of the transistor 101 in a capacitor connected to the transistor 101 is shown. Note that the circuit structure shown in FIG. 1A is a circuit structure for discharging charge held in a gate of the transistor, and actually realizes a connection relation in the circuit structure by controlling on/off of a plurality of switches provided between wirings. Note that in the diagram, a solid line shows a conduction state between elements, and a dotted line shows a non-conduction state. Note that switching between a conduction state and a non-conduction state is controlled by changing the connection by using an element such as a switch, a transistor, a resistor, or a capacitor.

In FIG. 1A, one of a source and a drain (hereinafter, referred to as a first terminal) of the transistor 101 and a wiring 103 are in a conduction state. The other of the source and the drain (hereinafter, referred to as a second terminal) of the transistor 101 and a gate of the transistor 101 are in a conduction state. A first terminal (also referred to as a first electrode) of a capacitor 102A and the gate of the transistor 101 are in a conduction state. A second terminal (also referred to as a second electrode) of the capacitor 102A, a first terminal (also referred to as a first electrode) of a capacitor 102B, the first terminal of the transistor 101, and the wiring 103 are in a conduction state. A second terminal (also referred to as a second electrode) of the capacitor 102B and the wiring 103 are in a conduction state.

In FIG. 1A, a first terminal (also referred to as a first electrode) of a display element 105 and the second terminal of the transistor 101 are in a non-conduction state. A terminal of the transistor 101 except its second terminal and the first terminal (also referred to as the first electrode) of the display element 105 are preferably in a non-conduction state, and a wiring or an electrode and the first terminal of the display element 105 are preferably in a non-conduction state. A second terminal (also referred to as a second electrode) of the display element 105 and a wiring 106 are preferably in a conduction state.

A wiring 104 and the second terminal of the transistor 101 are in a non-conduction state. Further, the wiring 104 and the second terminal of the capacitor 102A are in a non-conduction state, and the wiring 104 and the first terminal of the capacitor 102B are in a non-conduction state. Note that, as shown in FIG. 1A, the wiring 104 and the second terminal of the transistor 101, the wiring 104 and the second terminal of the capacitor 102A are preferably in a non-conduction state, the wiring 104 and a terminal of the capacitor 102B except its first terminal are preferably in a non-conduction state, and the wiring 104 and a wiring or an electrode are preferably in a non-conduction state.

Note that an image signal, a predetermined voltage, or the like is supplied to the transistor 101, the capacitor 102A, or the capacitor 102B through the wiring 104 in some cases. Accordingly, the wiring 104 can be referred to as "a source signal line", "an image signal line", "a video signal line", or the like.

A circuit structure in the period for compensating variation in current characteristics such as mobility of the transistor 101 is shown in FIG. 1B. Note that the circuit structure shown in FIG. 1B is to discharge charge held in the gate of the transistor in order to compensate variation in current characteristics such as mobility of the transistor 101, and actually realizes a connection relation in the circuit structure by controlling on/off of a plurality of switches provided between wirings.

In FIG. 1B, the first terminal of the transistor 101 and the wiring 103 are in a conduction state. The second terminal of the transistor 101 and the gate of the transistor 101 are in a conduction state. The first terminal of the capacitor 102A and the gate of the transistor 101 are in a conduction state. The second terminal of the capacitor 102A and the first terminal of the capacitor 102B are in a conduction state, and the second terminal of the capacitor 102B and the wiring 103 are in a conduction state.

In FIG. 1B, the first terminal of the display element 105 and the second terminal of the transistor 101 are in a non-conduction state. The first terminal of the display element 105 and a terminal of the transistor 101 except its second terminal are preferably in a non-conduction state, and the first terminal of the display element 105 and a wiring or an electrode are preferably in a non-conduction state. A second terminal of the display element 105 and the wiring 106 are preferably in a conduction state.

The wiring 104 and the second terminal of the transistor 101 are in a non-conduction state. Further, the wiring 104 and the second terminal of the capacitor 102A are in a non-conduction state, and the wiring 104 and the first terminal of the capacitor 102B are in a non-conduction state. Note that, as shown in FIG. 1B, the wiring 104 and the second terminal of the transistor 101 are preferably in a non-conduction state, the wiring 104 and a terminal of the capacitor 102A except its second terminal are preferably in a non-conduction state, the wiring 104 and a terminal of the capacitor 102B except its the first terminal are preferably in a non-conduction state, and the wiring 104 and the wiring or the electrode are preferably in a non-conduction state.

Note that it is preferable that a voltage corresponding to the threshold voltage of the transistor 101 is held in the capacitor 102A before a connection structure becomes like a connection structure in FIG. 1B, that is, before variation in current characteristics such as mobility of the transistor 101 is compensated, and then, an image signal (a video signal) is input to the capacitor 102B through the wiring 104. Accordingly, a voltage corresponding to the threshold voltage and an image signal voltage are held in the capacitor 102A and the capacitor 102B, respectively. As a result, since a voltage between the gate and the source of the transistor 101 is equal to the total voltage of voltages of the capacitors 102A and 102B, the total voltage of a voltage corresponding to the threshold voltage and an image signal voltage is held in the capacitors 102A and 102B. Therefore, in the state between after FIG. 1A and before FIG. 1B, that is, before the compensation of variation in mobility of the transistor 101, it is preferable that the wiring 104 and at least one of the drain of the transistor 101, the source of the transistor 101, the gate of the transistor 101, the second terminal of the capacitor 102A, the first terminal of the capacitor 102B, and the like are in a conduction state, and that an input operation of an image signal is already performed.

Note that there is a possibility that in the case where the capacitors 102A and 102B hold the total voltage of a voltage corresponding to the threshold voltage of the transistor 101 and an image signal voltage, the voltage slightly varies by switching noise or the like. However, there is no problem even if voltage slightly varies, as long as some variation does not hamper actual operation. Accordingly, for example, in the case where the total voltage of the voltage corresponding to the threshold voltage of the transistor 101 and an image signal voltage is input to the capacitors 102A and 102B, the voltage actually held in the capacitors 102A and 102B is not completely equal to and slightly different from the input voltage due to influence of noise or the like in some cases. Note that a minor fluctuation is insignificant as long as the fluctuation is within the range that does not influence on actual operation.

Next, a circuit structure in the period in which current is supplied to the display element 105 through the transistor 101 is shown in FIG. 1C. Note that the circuit structure shown in FIG. 1C is to supply current from the transistor 101 to the display element 105, and actually realizes a connection relation of the circuit structure by controlling on/off of a plurality of switches provided between wirings.

In FIG. 1C, the first terminal of the transistor 101 and the wiring 103 are in a conduction state. The second terminal of the transistor 101 and the first terminal of the display element 105 are in a conduction state. The second terminal of the transistor 101 and the gate of the transistor 101 are in a non-conduction state. The first terminal of the capacitor 102A and the gate of the transistor 101 are in a conduction state. The second terminal of the capacitor 102A and the first terminal of the capacitor 102B are in a conduction state. The second terminal of the capacitor 102B and the wiring 103 are in a conduction state. The second terminal of the display element 105 and the wiring 106 are in a conduction state.

In FIG. 1C, the wiring 104 and the second terminal of the transistor 101 are in a non-conduction state. Further, the wiring 104 and the second terminal of the capacitor 102A are in a non-conduction state, and the wiring 104 and the first terminal of the capacitor 102B are in a non-conduction state. Note that, as shown in FIG. 1C, the wiring 104 and the second terminal of the transistor 101 are preferably in a non-conduction state, the wiring 104 and the second terminal of the capacitor 102A are preferably in a non-conduction state, the wiring 104 and a terminal of the capacitor 102E except its first terminal are preferably in a non-conduction state, and the wiring 104 and the wiring or the electrode are preferably in a non-conduction state.

That is, in transition from the period for compensating variation in current characteristics such as mobility of the transistor 101 (FIG. 1B) to the period for supplying current to the display element 105 through the transistor 101 (FIG. 1C), at least, the conduction states between the second terminal of the transistor 101 and the gate of the transistor 101, and between the second terminal of the transistor 101 and the first terminal (or the first electrode) of the display element 105 are changed. However, this embodiment is not limited thereto and a conduction state of another part can also be changed. Then, an element such as a switch, a transistor, or a diode, is preferably disposed so as to control a conduction state as described above. Then, a conduction state is controlled with the element, so that the circuit structure realizing the connection state in FIGS. 1A to 1C can be realized. Accordingly, an element such as a switch, a transistor, or a diode, can be freely disposed and there is no limitation in the number of elements or a connection structure as long as the connection state in FIGS. 1A to 1C can be realized.

Figure 2A:
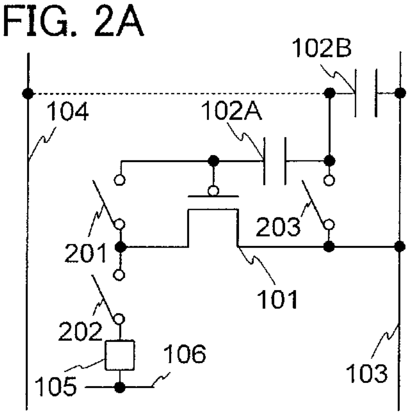
FIGS. 2A to 2D are diagrams each illustrating a circuit or a driving method shown in an embodiment.

As an example, as shown in FIG. 2A, a first terminal of a switch 201 is electrically connected to the gate of the transistor 101, and a second terminal of the switch 201 is electrically connected to the second terminal of the transistor 101. Then, a first terminal of a switch 202 is electrically connected to the second terminal of the transistor 101, and a second terminal of the switch 202 is electrically connected to the display element 105. Then, a first terminal of the switch 203 is electrically connected to the second terminal of the capacitor 102A and the first terminal of the capacitor 102B. A second terminal of the switch 203 is electrically connected to the first terminal of the transistor 101 and the wiring 103. In this manner, by arrangement of the three switches, a circuit structure realizing the connection state in FIG. 1A to 1C can be realized.

Figure 2B:
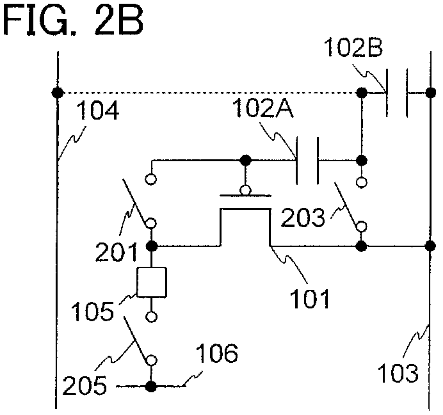
Figure 2C:
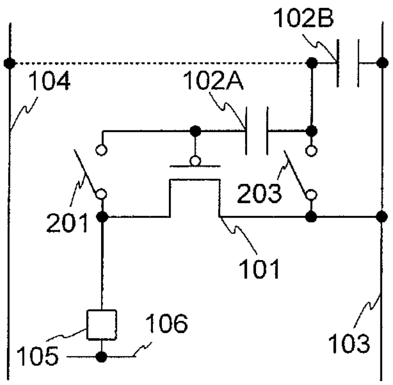

Different examples from the example in FIG. 2A are shown in FIGS. 2B and 2C. In FIG. 2B, the switch 202 above the display element 105 in FIG. 2A is not provided, and the switch 205 is additionally provided below the display element 105. In FIG. 2C, the switch 202 in FIG. 2A is not provided. Instead, for example, the display element 105 is placed into a non-conduction state by change of the potential of the wiring 106, whereby the operation which is similar to that of FIG. 1A can be realized. Then, when a switch, a transistor, or the like is further needed, it is provided as appropriate.

Note that the expression “A and B are in a conduction state” can indicate connection of various elements between A and B. For example, a resistor, a capacitor, a transistor, a diode, and the like can be connected in series or in parallel between A and B. Similarly, the expression “A and B are in a non-conduction state” can indicate connection of various elements are connected between A and B. As long as at least A and B are in a non-conduction state, various elements can be connected in other portions. For example, elements such as a resistor, a capacitor, a transistor, a diode, and the like can be connected in series or in parallel.

Figure 2D:
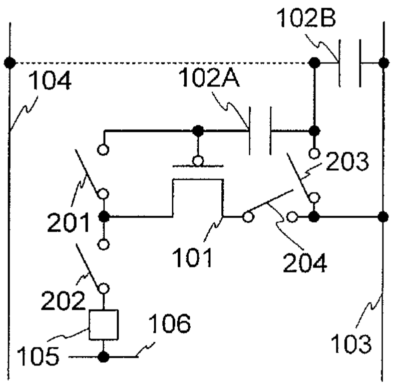
Figure 10A:
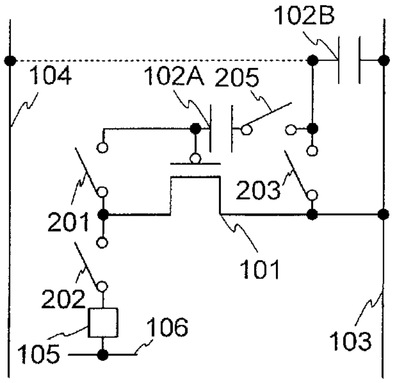
FIGS. 10A to 10C are diagrams each illustrating a circuit or a driving method shown in an embodiment.
Figure 10B:
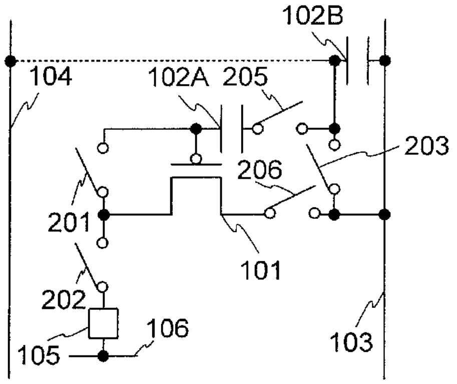

Therefore, for example, FIG. 2D, FIG. 10A, and FIG. 10B illustrate, respectively, a circuit obtained by additionally providing a switch 204 in the circuit of FIG. 2A, a circuit obtained by additionally providing a switch 205 in the circuit of FIG. 2A, and a circuit obtained by additionally providing a switch 206 in the circuit of FIG. 10A.

Figure 10C:
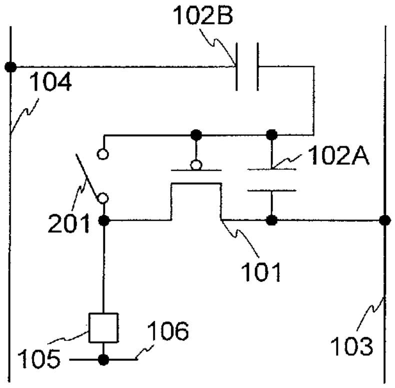

In addition, in each connection of wirings and elements, switches for establishing or breaking a conduction state can be eliminated. A circuit where switches are eliminated is shown in FIG. 10C. A circuit shown in FIG. 10C can perform operations similar to those shown in FIGS. 1A to 1C by, for example, connecting the second terminal of the capacitor 102B to the wiring 104 to each other, and controlling a potential of the wirings 103, a potential of the wirings 104, a potential of the wirings 106, and on/off of each switch. Note that the capacitor 102B can be eliminated by using parasitic capacitance of the transistor 101.

In this manner, in the period in which variation in current characteristics such as mobility of the transistor 101 is compensated (FIG. 1B), variation in current characteristics such as mobility of the transistor 101 is reduced, so that variation in current supplied to the display element 105 is also reduced in the period in which current is supplied to the display element 105 (FIG. 1B). As a result, variation in a display state of the display element 105 can also be reduced, whereby a display with high quality can be obtained.

The above-described circuit structures illustrated in FIGS. 2A to 2D and FIGS. 10A to 10C are used as examples to realize the circuit structures illustrated in FIGS. 1A to 1C. Note that, actually, the connection relation in the circuit structure is realized by controlling on/off of a plurality of switches provided between wirings in addition to the plurality of switches illustrated in FIGS. 2A to 2D and FIGS. 10A to 10C.

Note that the period in which current is supplied to the display element 105 (FIG. 1C) is preferably made to appear immediately after the period in which variation in current characteristics such as mobility of the transistor 101 is compensated (FIG. 1B). This is because, in the period in which current is supplied to the display element 105 (FIG. 1C), the process is performed by using the gate potential (charge held in the capacitors 102A and 102B) of the transistor 101 obtained in the period in which current is supplied to the display element 105 (FIG. 1C). However, this embodiment is not limited to the structure in which the period in which current is supplied to the display element 105 (FIG. 1C) appears immediately after the period in which variation in current characteristics such as mobility of the transistor 101 is compensated (FIG. 1B). For example, in the case where the amount of charge in the capacitors 102A and 102B is changed in the period in which variation in current characteristics such as mobility of the transistor 101 is compensated and the amount of charge in the capacitors 102A and 102B, which is determined at the termination of the period, is not largely changed in the period in which current is supplied to the display element 105 (FIG. 1C), a period for another process may be provided between the period in which variation in current characteristics such as mobility of the transistor 101 is compensated (FIG. 1B) and the period in which current is supplied to the display element 105 (FIG. 1B).

Thus, it is preferable the charge held in the capacitors 102A and 102B at the termination of the period in which variation in current characteristics such as mobility of the transistor 101 is compensated is substantially equal in amount to the charge held in the capacitors 102A and 102B at the start of the period in which current is supplied to the display element 105. Note that there may be an insignificant difference between both these periods due to the influence of noise or the like. Specifically, the difference in the amount of charge between both these periods is preferably 10% or less, more preferably 3% or less. It is more preferable that the difference of the amount of charge is 3% or less, because human eyes cannot receive the difference when a human sees a display element affected by the difference.

Figure 3A:
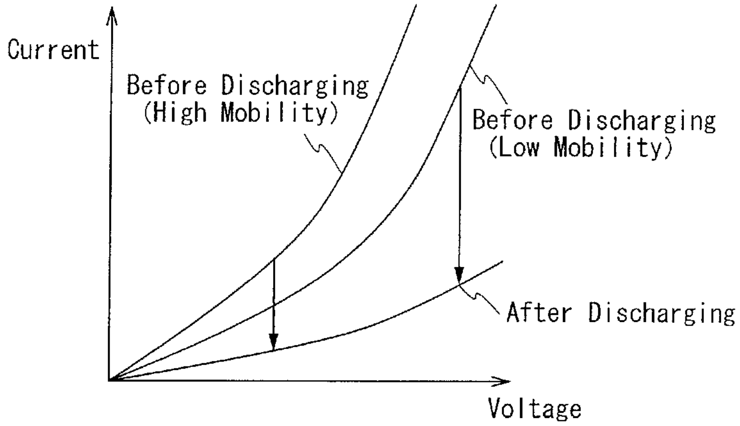
FIGS. 3A and 3B are diagrams each illustrating operation of a pixel shown in an embodiment.

FIG. 3A illustrates a change in the state of current-voltage characteristics in the period in which variation in current characteristics such as mobility of the transistor 101 is compensated (FIG. 1B). The charge held in the capacitors 102A and 102B is discharged through the source (first terminal) and the drain (second terminal) of the transistor 101 in the period in which variation in current characteristics such as mobility of the transistor 101 is compensated (FIG. 1B). Thus, the amount of charge held in the capacitors 102A and 102B is decreased, and the voltage held in the capacitors 102A and 102B is also decreased. Accordingly, the absolute value of the voltage between the gate and the source of the transistor 101 is also decreased. Because the charge held in the capacitors 102A and 102B is discharged through the transistor 101, the amount of charge to be discharged depends on the current characteristics of the transistor 101. In other words, the higher the mobility of the transistor 101 is, the larger the amount of discharged charge is. Alternatively, the larger the ratio (W/L) of channel width W to channel length L of the transistor 101 becomes, the larger the amount of charge is discharged. Alternatively, as the absolute value of the voltage between the gate and the source of the transistor 101 becomes larger (i.e., the absolute value of the voltage held in the capacitors 102A and 102B becomes larger), a larger amount of charge is discharged. Alternatively, the smaller the parasitic resistance in the source region and the drain region of the transistor 101 becomes, the larger the amount of discharged charge is. Alternatively, the smaller the resistance of an LDD region of the transistor 101 becomes, the larger the amount of charge is discharged. Further alternatively, the smaller the contact resistance of a contact hole which is electrically connected to the transistor 101 becomes, the larger the amount of charge is discharged.

Accordingly, a graph of the current-voltage characteristics in the period before discharge, that is, a period before the period in which variation in current characteristics such as mobility of the transistor 101 is compensated (FIG. 1B) shows a change to a curve with a gentle slope as a result of discharge of part of the charge held in the capacitors 102A and 102B in the period in which variation in current characteristics such as mobility of the transistor 101 is compensated (FIG. 1B). Then, for example, the difference between the graphs of current-voltage characteristics before and after the discharge becomes larger as the mobility of the transistor 101 is higher. Thus, when the mobility of the transistor 101 is high (i.e., when the slope of the graph is large), the amount of change in slope is large after the discharge; when the mobility of the transistor 101 is low (i.e., when the slope of the graph is small), the amount of change in slope is small after the discharge. As a result, after the discharge, the difference of the graphs of current-voltage characteristic is small between the case where the transistor 101 has high mobility and the case where the transistor 101 has low mobility, whereby influence of variation in mobility can be reduced. Moreover, if the absolute value of the voltage between the gate and the source of the transistor 101 is large (i.e., the absolute value of the voltage held in the capacitors 102A and 102B is large), a larger amount of charge is discharged. On the other hand, if the absolute value of the voltage between the gate and the source of the transistor 101 is small (i.e., the absolute value of the voltage held in the capacitors 102A and 102B is small), a smaller amount of charge is discharged. Accordingly, variation in mobility can be reduced as more appropriate.

Figure 3B:
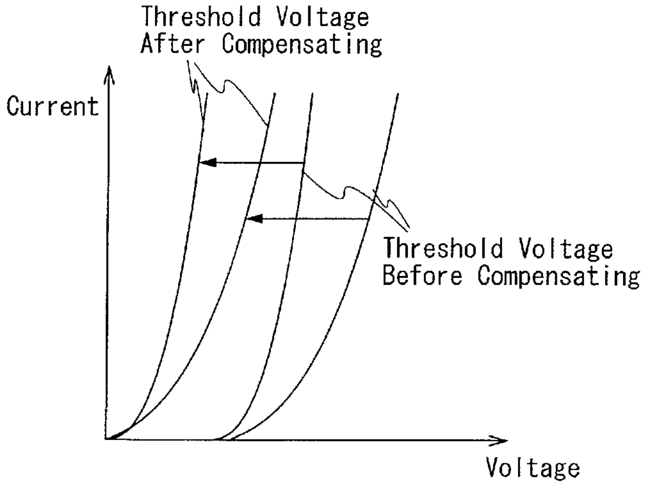

Note that a graph shown in FIG. 3A is the graph of the state after the period compensating variation in the threshold voltage of the transistor 101. Therefore, as shown in FIG. 3B, influence of the variation in the threshold voltage is reduced due to the period of the state shown in FIG. 1A before the period for compensating variation in mobility of the transistor 101 (FIG. 1B) starts. In order to reduce the variation in the threshold voltage, the graph of current-voltage characteristics is shifted horizontally by the threshold voltage. In other words, in the period shown in FIG. 1B, the voltage between a gate and a source of the transistor is the total of image signal voltage and the threshold voltage. As a result, influence of variation in the threshold voltage is reduced. After variation in threshold voltage is reduced, as shown in the graph of FIG. 3A, variation in current characteristics of the transistor 101 can be largely reduced by reducing variation in mobility.

Note that current characteristics of the transistor 101 whose variation can be compensated include not only mobility, but also the threshold voltage, parasitic resistance in the source portion (the drain portion), and resistance in the lightly doped drain region (LDD region) of the transistor 101, contact resistance in a contact hole electrically connected to the transistor 101, and the like. Variation in these current characteristics can also be reduced as in the case of mobility, because charge is discharged through the transistor 101.

Thus, the amount of charge in the capacitors 102A and 102B in a period before the discharge, that is, in the period before the period in which variation in current characteristics such as mobility of the transistor 101 is compensated (FIG. 1B) is larger than that at the termination of the period in which variation in current characteristics such as mobility of the transistor 101 is compensated (FIG. 1B). This is because in the period in which variation in current characteristics such as mobility of the transistor 101 is compensated (FIG. 1B), charge in the capacitors 102A and 102B is discharged, so that the amount of charge held in the capacitors 102A and 102B is reduced.

Note that the discharge of the charge held in the capacitors 102A and 102B is preferably stopped soon after part of the charge is discharged. If the charge is completely discharged, that is, if the charge is discharged until no current flows, information of an image signal is almost lost. Thus, it is preferable that the discharge is stopped before charge is completely discharged. In other words, the discharge is preferably stopped while current flows to the transistor 101.

Accordingly, when the length of one gate selection period (or one horizontal period, a value obtained by dividing one frame period by the number of rows of pixels, or the like) is compared with that of the period in which variation in current characteristics such as mobility of the transistor 101 is compensated (FIG. 1B), one gate selection period (or one horizontal period, a value obtained by dividing one frame period by the number of rows of pixels, or the like) is preferably longer. This is because if charge is discharged for a longer period than one gate selection period, it is possible that the discharge is performed too much. Note that this embodiment is not limited thereto.

Alternatively, when the length of a period in which an image signal is input to a pixel is compared with that of the period in which variation in current characteristics such as mobility of the transistor 101 is compensated (FIG. 1B), the period in which an image signal is input to a pixel is preferably longer. This is because if charge is discharged for a longer period than the period in which an image signal is input to a pixel, it is possible that the discharge is performed too much. Note that this embodiment is not limited thereto.

Alternatively, the length of a period in which the threshold voltage of the transistor is obtained (FIG. 1A) is compared with that of the period in which variation in current characteristics such as mobility of the transistor 101 is compensated (FIG. 1A), the period in which the threshold voltage of the transistor is obtained is preferably longer. This is because if charge is discharged for a longer period than the period in which the threshold voltage of the transistor is obtained, it is possible that the discharge is performed too much. Note that this embodiment is not limited thereto.

Note that in the period in which variation in current characteristics such as mobility of the transistor 101 is compensated (FIG. 1B), the length of the period in which the charge held in the capacitors 102A and 102B is discharged is preferably determined in accordance with the amount of variation in mobility of the transistor 101, the size of the capacitors 102A and 102B, the W/L of the transistor 101, or the like, for example.

For example, the case where there are a plurality of circuits as illustrated in any of FIGS. 1A to 1C or FIGS. 2A to 2D is considered. As an example, each circuit includes a first pixel for displaying a first color and a second pixel for displaying a second color. As a transistor corresponding to the transistors 101, the first pixel and the second pixel include a transistor 101A and a transistor 101B, respectively. Similarly, as capacitors corresponding to the capacitor 102A, the first pixel and the second pixel include a capacitor 102A_1 and a capacitor 102A_1, respectively. In addition, as capacitors corresponding to the capacitor 102B, the first pixel and the second pixel include a capacitor 102B_1 and a capacitor 102B_2, respectively.

Then, when the W/L of the transistor 101A is larger than W/L of the transistor 101B, it is preferable that total capacitance value of the capacitors 102A_1 and 102B_1 is larger than that of the capacitors 102A_2 and 102B_2. Since the amount of charge discharged from the transistor 101A is larger than that of charge from the transistor 101B, the total of voltage of the capacitors 102A_2 and 102B_2 is also largely changed. Thus, it is preferable that the total capacitance value of the capacitors 102A_1 and 102B_1 is large in order to adjust the amount of the voltage change. Alternatively, when the channel width W of the transistor 101A is larger than the channel width W of the transistor 101B, it is preferable that the total capacitance value of the capacitors 102A_1 and 102B_1 is larger than the total capacitance value of the capacitors 102A_2 and 102B_2. Alternatively, when the channel length L of the transistor 101A is smaller than the channel length L of the transistor 101B, it is preferable that the total capacitance value of the capacitors 102A_1 and 102B_1 is larger than the total capacitance value of the capacitors 102A_2 and 102B_2.

Figure 4A:
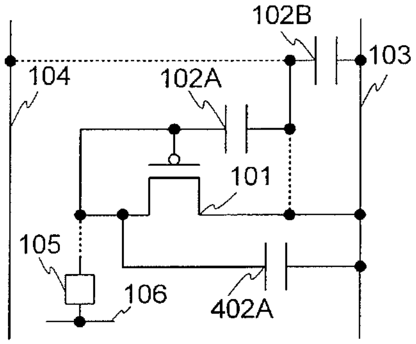
FIGS. 4A to 4F are diagrams each illustrating a circuit or a driving method shown in an embodiment.
Figure 4B:
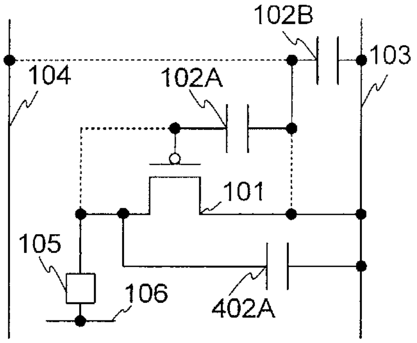

Note that it is possible to provide a capacitor additionally in order to control the amount of discharge of total charge of charge held in the capacitors 102A and charge held in 102B. For example, FIGS. 4A and 4B illustrate examples in the case where a capacitor is additionally provided for in the structures of FIGS. 1B and 1C. Note that circuit structures illustrated in FIGS. 4A to 4F are examples which realize the circuit structures illustrated in FIGS. 1B and 1C. Note that, actually, the relation in connection of the circuit structure is realized by controlling on/off of a plurality of switches between wirings in addition to the plurality of switches and capacitors provided illustrated in FIGS. 4A to 4F.

In FIGS. 4A and 4B, a first terminal of the capacitor 402A and the second terminal of the transistor 101 are in conduction state. A second terminal of the capacitor 402A and the wiring 103 are in conduction state. Note that in FIG. 4B, the conduction states of the terminals of the capacitor 402A is preferably the same as those in FIG. 4A. Some of the terminals of the capacitor 402A may be in a non-conduction state. Note that as a period before the state of FIG. 4A, there is a period in which the threshold voltage of the transistor 101 is compensated as shown in FIG. 1A.

Figure 4C:
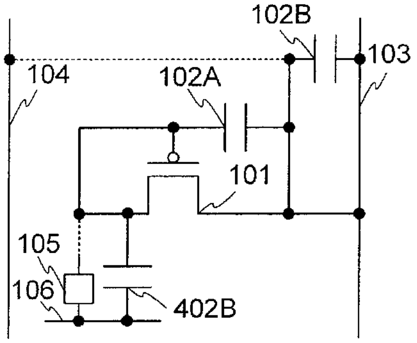
Figure 4D:
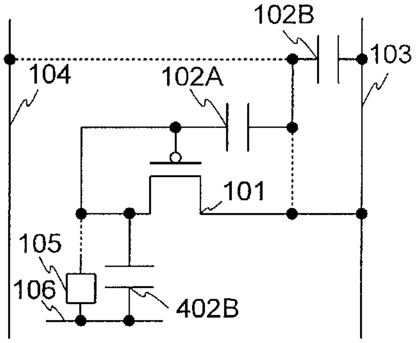

Similarly, FIGS. 4C and 4D illustrate examples when a capacitor is additionally provided for each circuit of FIGS. 1A and 1B. A first terminal of a capacitor 402B and the second terminal of the transistor 101 are in conduction state, and a second terminal (also referred to as a second electrode) of the capacitor 402B and the wiring 106 are in conduction state. Note that, in FIG. 4D, it is preferable that a conduction state of each terminal of the capacitor 402B is similar to that in FIG. 4C. Note that some of terminals of the capacitor 402B may be in a non-conduction state.

For example, the cases where there are a plurality of circuits which are illustrated in FIGS. 4A to 4F or the like is considered. As an example, the circuit includes a first pixel for displaying a first color and a second pixel for displaying a second color. As the transistors corresponding to the transistor 101, the first pixel and the second pixel include the transistor 101A and the transistor 101B, respectively. Similarly, as capacitors corresponding to the capacitor 102A, the first pixel and the second pixel include the capacitor 102A_1 and the capacitor 102A_2, respectively. In addition, as capacitors corresponding to the capacitor 102B, the first pixel and the second pixel include the capacitor 102B_1 and the capacitor 102B_2, respectively. Furthermore, as capacitors corresponding to at least any one of the capacitors 402A to 402C, the first pixel and the second pixel include a capacitor 402A_1 and a capacitor 402A_2, respectively.

Then, when W/L of the transistor 101A is larger than W/L of the transistor 101B, it is preferable that the total capacitance value of the capacitors 102A_1 and 102B_1 is larger than that of the capacitors 102A_2 and 102B_2. Alternatively, it is preferable that the total capacitance value of the capacitors 402A_1 and 402B_1 is larger than that of capacitors 402A_2 and 402B_2. Alternatively, it is preferable that the total capacitance value of the capacitors 102A_1, 102B_1, 402A_1, and 402B_1 is larger than that of the capacitors 102A_2, 102B_2, 402A_2, and 402B_2. Since the amount of charge discharged from the transistor 101A is larger than that of charge from the transistor 101B, a potential is adjusted. Alternatively, when the channel width W of the transistor 101A is larger than the channel width W of the transistor 101B, it is preferable that the capacitance value of the capacitor 102A_1 is larger than the capacitance value of the capacitor 102A_2. Alternatively, it is preferable that the total capacitance value of the capacitors 402A_1 and 402B_1 is larger than that of the capacitors 402A_2 and 402B_2. Alternatively, it is preferable that the total capacitance value of the capacitors 102A_1, 102B_1, 402A_1, and 402B_1 is larger than that of the capacitors 102A_2, 102B_2, 402A_2, and 402B_2. Alternatively, when the channel length L of the transistor 101A is smaller than the channel length L of the transistor 101B, it is preferable that the total capacitance value of the capacitors 102A_1 and 102B_1 is larger than that of the capacitors 102A_2 and 102B_2. Alternatively, it is preferable that the total capacitance value of the capacitors 402A_1 and 402B_1 is larger than that of the capacitors 402A_2 and 402B_2. Alternatively, it is preferable that the total capacitance value of the capacitors 102A_1, 102B_1, 402A_1, and 402B_1 is larger than that of the capacitors 102A_2, 102B_2, 402A_2, and 402B_2.

Note that the following state is possible: the total capacitance value of the capacitors 402A_1 and 402B_1 is different from that of the capacitors 402A_2 and 402B_2, and the total capacitance value of the capacitors 102A_1 and 102B_1 is substantially equal to that of the capacitors 102A_2 and 102B_2. In other words, the capacitance value can be adjusted using not the total capacitance value of the capacitors 102A_1 and 102B_1 and the total capacitance value of the capacitors 102A_2 and 102B_2, but the capacitors 402A_1 and 402A_2. When the total capacitance value of the capacitors 102A_1 and 102B_1 is different from that of the capacitors 102A_2 and 102B_2, it is possible that levels of image signals are possible to differ, which may cause other significant adverse effects. Therefore, it is preferable that the capacitance value is adjusted using the capacitors 402A_1 and 402A_2.

Figure 5A:
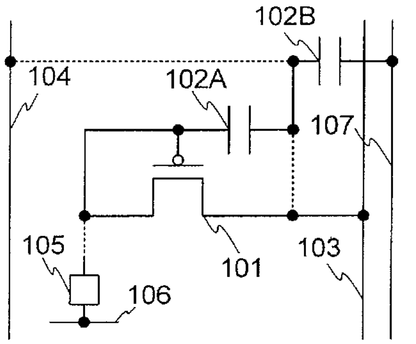
FIGS. 5A to 5D are diagrams each illustrating a circuit or a driving method shown in an embodiment.
Figure 5B:
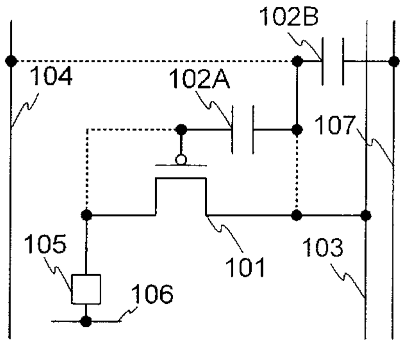
Figure 5C:
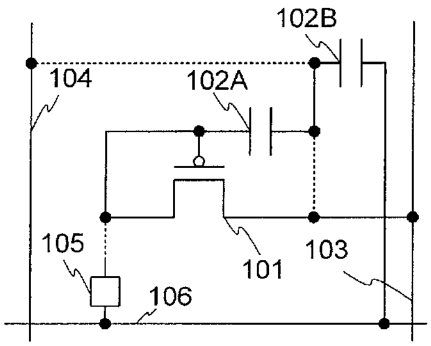
Figure 5D:
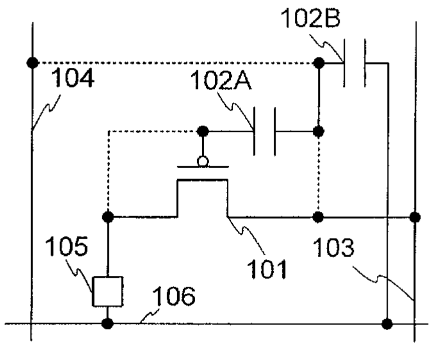

Note that the connection structure of the circuit is not limited to those shown in FIGS. 1A to 1C. For example, in FIGS. 1A to 1C, the second terminal of the capacitor 102B and the wiring 103 are in a conduction state. Note that at least in a predetermined period, the second terminal of the capacitor 102B and a wiring having a function of supplying a constant potential may be in a conduction state. For example, FIG. 5A and FIG. 1B illustrate examples where the second terminal of the capacitor 102B is connected to the wiring 107. Similarly, FIGS. 5C and 5D illustrate examples where the second terminal of the capacitor 102B is connected to the wiring 106.

Figure 4E:
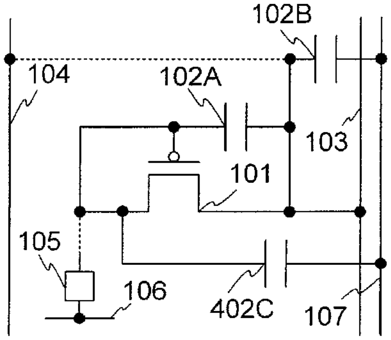
Figure 4F:
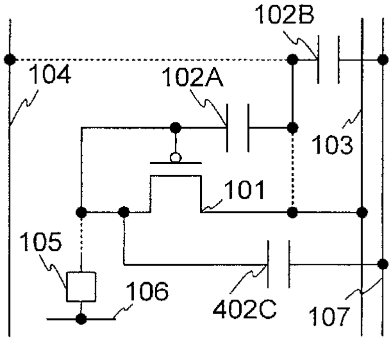

Note that, a capacitor can be additionally provided for the circuits in FIGS. 5A to 5D as in a manner similar to those in FIGS. 4A to 4D. As examples, FIGS. 4E and 4F illustrate the case where the capacitor 402C is additionally provided for the circuits in FIG. 5A and FIG. 1B.

Note that in FIGS. 5A to 5D, a switch can be provided in the manner similar to that in FIGS. 2A to 2D and FIGS. 10A to 10C.

Note that, in FIGS. 1A to 1C, FIGS. 2A to 2D, FIGS. 4A to 4F, FIGS. 5A to 5D, FIGS. 10A to 10C, and the like, a structure where a plurality of capacitors may be provided and arranged in connection in series or in parallel may be used.

Figure 6A:
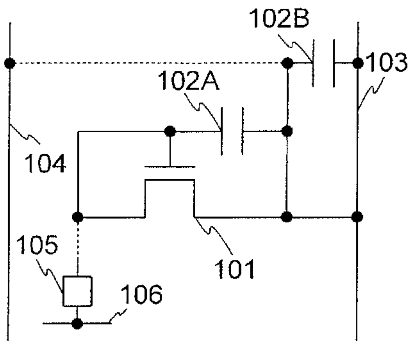
FIGS. 6A to 6D are diagrams each illustrating a circuit or a driving method shown in an embodiment.
Figure 6B:
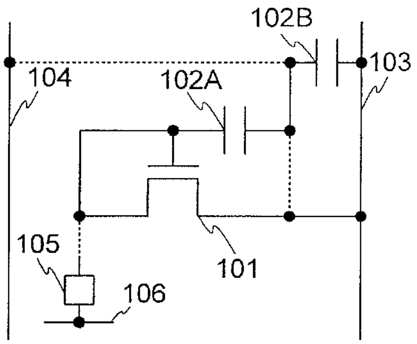
Figure 6C:
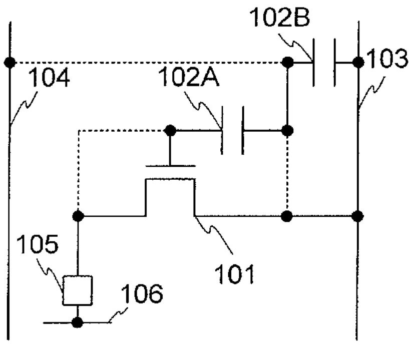
Figure 6D:
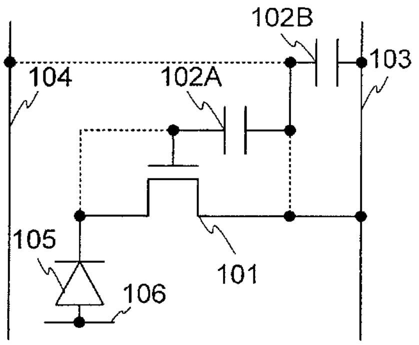

Note that the case where the transistor 101 is a p-channel transistor in FIGS. 1A to 1C, FIGS. 2A to 2D, FIGS. 4A to 4F, FIGS. 5A to 5D, FIGS. 10A to 10C, and the like is described. Note that as illustrated in FIGS. 6A to 6D, an n-channel transistor can be used. As examples, the cases where an n-channel transistor is used as the circuits in FIGS. 1A to 1C are illustrated in FIGS. 6A to 6C. In addition, a method in these cases can be applied to the other cases. In addition, a circuit structure illustrated in FIG. 6D is an example of the use of an EL element as the display element 105 of FIG. 6C. Note that circuit structures illustrated in FIGS. 6A to 6D are used as examples which realize the circuit structures illustrated in FIGS. 1A to 1C. Note that, actually, the relation in connection of the circuit structure is realized by controlling on/off of the plurality of switches provided between wirings in addition to the plurality of switches and capacitors illustrated in FIGS. 6A to 6C.

Note that the transistor 101 controls the amount of current flowing into the display element 105 and has a capability for driving the display element 105 in many cases.

Note that the wiring 103 has a capability to supply electric power to the display element 105 in many cases. Alternatively, the wiring 103 has a capability to supply current which flows in the transistor 101 in many cases.

Note that the wiring 107 has a capability for supplying voltage to the capacitor 102A or the capacitor 102B in many cases. Alternatively, in many cases, the wiring 107 has a function by which a gate potential of the transistor 101 is not easily changed by noise or the like.

Note that voltage corresponding to the threshold voltage of the transistor 101 means the voltage having a level that is the same level as or close to the threshold voltage of transistor 101. For example, when the threshold voltage of the transistor 101 is high, the voltage corresponding to the threshold voltage is also high. When the threshold voltage of the transistor 101 is low, the voltage corresponding to the threshold voltage is also low. As thus described, voltage of which level is determined depending on the threshold voltage is referred to as voltage corresponding to the threshold voltage. Thus, the voltage of which level is slightly different from the threshold voltage due to influence of noise can also be referred to as the voltage corresponding to the threshold voltage.

Note that the display element 105 is an element having functions of change luminance, brightness, reflectivity, transmittance, or the like. Thus, as an example of the display element 105, a liquid crystal element, a light-emitting element, an organic EL element, an electrophoretic element, or the like can be used.

Note that in this embodiment, what is illustrated in the drawing can be freely combined with or replaced with what is described in other embodiments as appropriate.

Embodiment 2

This embodiment will be described a specific example of the circuit and driving method described in Embodiment 1.

A specific example of the circuit structure described in Embodiment 1 is illustrated in FIGS. 8A to 8F. A first terminal of a switch 601 is connected to the wiring 104. A second terminal of the switch 601 is connected to the second terminal of the capacitor 102A, the first terminal of the capacitor 102B, and the first terminal of the switch 203. The second terminal of the switch 203 is connected to the wiring 103 and the first terminal of the transistor 101. The first terminal of the capacitor 102A is connected to the gate of the transistor 101 and a first terminal of the switch 201. The second terminal of the transistor 101 is connected to the second terminal of the switch 201 and a first terminal of the switch 202. The second terminal of the switch 202 is connected to the first terminal of the display element 105. A second terminal of the display element 105 is connected to the wiring 106.

Note that a switch is preferably provided additionally in order to control a potential of the gate of the transistor 101 or a potential of the second terminal of the transistor 101. However, the present invention is not limited thereto. An example of a circuit additionally provided with a switch is shown in each of FIGS. 8B and 8C. In FIG. 8B, a switch 602 is additionally provided. A first terminal of the switch 602 is connected to the gate of the transistor 101 and a second terminal of the switch 602 is connected to a wiring 606. In FIG. 8C, a switch 602 is additionally provided. A first terminal of the switch 602 is connected to the second terminal of the transistor 101 and a second terminal of the switch 602 is connected to the wiring 606. By using such a structure, unnecessary current flowing into the display element 105 in initialization or the like can be reduced. Thus, luminance in displaying black can further be reduced, so that a contrast can be improved.

Note that one wiring is used to serve as the wiring 606 and another wiring, so that the number of the wirings can be reduced. For example, FIG. 8D illustrates an example in which the wiring 106 serves as the wiring 106 and the wiring 606, so that only the wiring 106 is used. The first terminal of the switch 602 is connected to the gate of the transistor 101, and the second terminal is connected to the wiring 106. As thus described, the second terminal of the switch 602 can be connected to various wirings without limitation. Then, one wiring is also used as another wiring, so that the number of the wirings can be reduced. Note that although the second terminal of the capacitor 102B and the first terminal of the transistor are connected to the wiring 103, the second terminal of the capacitor 102B and the first terminal of the transistor can be connected to different wirings.

Note that the connection structure of the circuit is not limited thereto. As long as elements are provided so as to be able to desirably operate, various circuit structures can be realized by providing a switch, a transistor, or the like in various places.

As thus described, an example of the structure described in Embodiment 1 can have a variety of structures. Further, specific examples can similarly be realized in other structures.

Figure 8A:
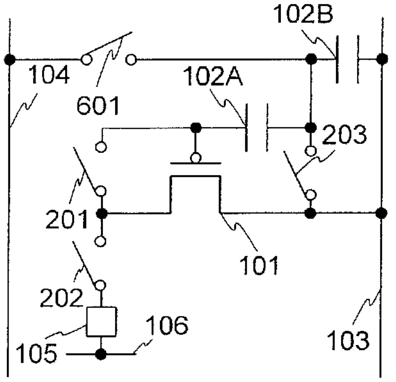
FIGS. 8A to 8F are diagrams each illustrating a circuit or a driving method shown in an embodiment.
Figure 8B:
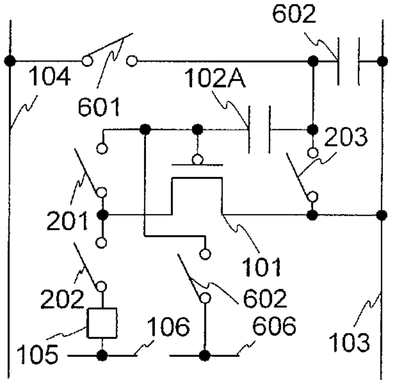
Figure 8C:
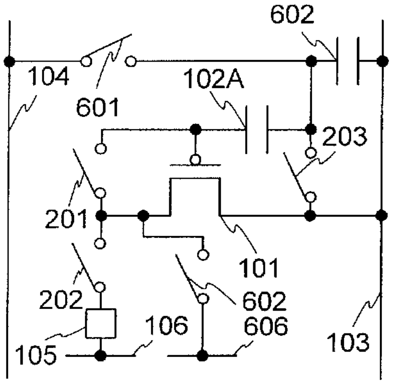
Figure 8D:
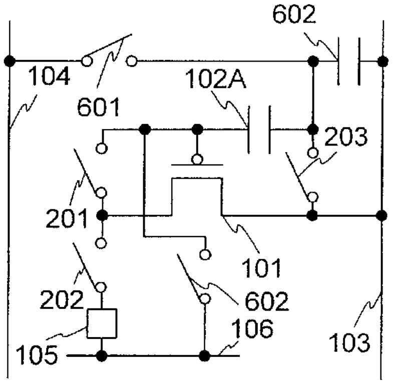
Figure 8E:
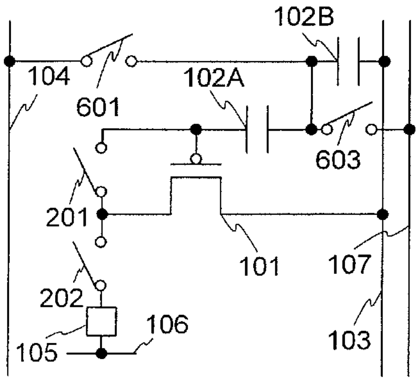
Figure 8F:
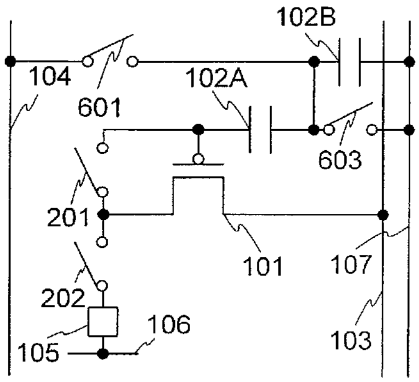

As an example, examples of the structure in FIG. 5A are illustrated in FIGS. 8E and 8F. Note that in FIG. 8E, the second terminal of the switch 603 is connected to the wiring 107. Note that in FIG. 8F, the second terminal of the capacitor 102B is connected the wiring 107. However, the embodiment is not limited thereto.

Figure 9A:
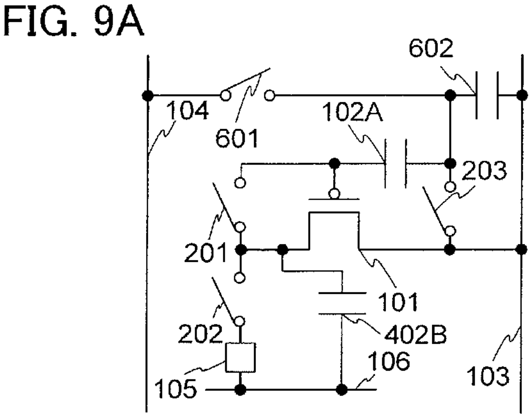
FIGS. 9A to 9C are diagrams each illustrating a circuit or a driving method shown in an embodiment.

Further, example of the structure in FIGS. 4C and 4D is illustrated in FIG. 9A. The first terminal of the capacitor 402B is connected to the second terminal of the transistor 101, and the second terminal of the capacitor 402B is connected to the wiring 106.

Figure 9B:
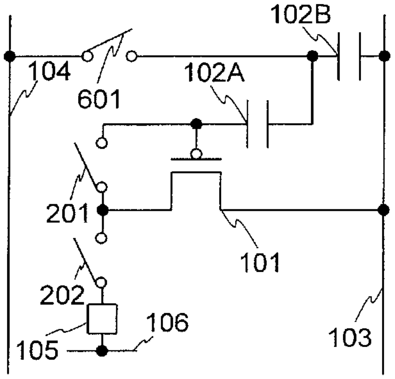

Note that the switch 203 can be eliminated by controlling a potential supplied to the wiring 104 and by controlling timing of on/off of the switch 601. For example, FIG. 9B shows the case where the switch 203 is eliminated. In this manner, the switch 203 is not particularly needed and can be eliminated. Then, the number of elements forming a pixel can be reduced by removing the switch 203.

Figure 9C:
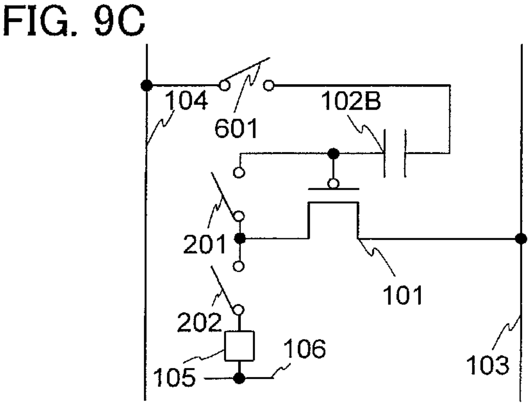

Note that the capacitor 102A can be eliminated by utilizing parasitic capacitance caused by cross-over capacitance of wirings, or the like. For example, FIG. 9C shows the case where the capacitor 102B and the switch 203 are eliminated. In this manner, the capacitor 102B and the switch 203 are not particularly needed and can be eliminated. Then, the number of elements forming a pixel can be reduced by removing the capacitor 102A and the switch 203.

As thus described, in FIGS. 8A to 8F and FIGS. 9A to 9C, part of examples of the structure described in Embodiment 1 is described; other examples can also be realized in a similar manner.

Next, an operation method will be described. Here, description is made with reference to the circuit of FIG. 8A. However, the similar operation method can be applied to another circuit. Note that reference numerals representing elements in each of FIGS. 7A to 7E are similar to those in FIG.

8 and are omitted here. In addition, a dotted-line arrow in FIGS. 7A to 7E illustrates flow of current in each period for visualization.

Figure 7A:
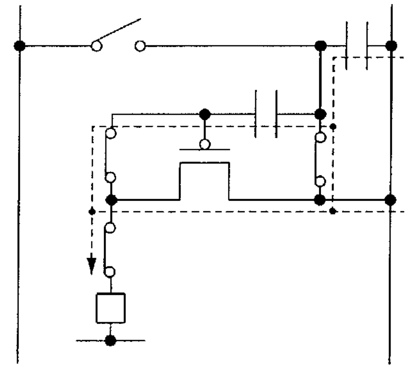
FIGS. 7A to 7E are diagrams illustrating a circuit or a driving method shown in an embodiment.

First, in a period illustrated in FIG. 7A, initialization of a potential is performed on each node. This operation is to set potentials of the gate, the first terminal, and the second terminal of the transistor 101 to a predetermined potential, whereby the transistor 101 can be turned on. Alternatively, a predetermined voltage is supplied to the capacitor 102A. Alternatively, initialization of charge held in the capacitor 102A is performed. Therefore, charge is held in the capacitor 102A. The switches 201, 202, and 203 are on. The switch 601 is preferably off. However, the embodiment is not limited thereto.

Note that it is preferable that the potential of the wiring 106 is lower than that of the wiring 103. Note that the potential is not limited thereto. These potentials are used when the transistor 101 is a p-channel transistor. Thus, when the polarity of the transistor 101 is an n-channel type, it is preferable that the potential of the wiring 106 is higher than that of the wiring 103.

Figure 7B:
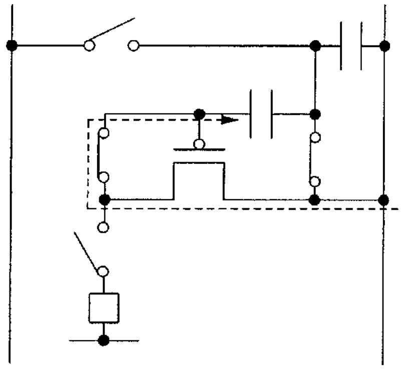

Then, in a period illustrated in FIG. 7B, operation for compensating variation in threshold voltage of the transistor 101 is performed. Note that the period corresponds to the period of the state shown in FIG. 1A. A voltage corresponding to the threshold voltage of the transistor 101 is held in a capacitor. The switches 201 and 203 are on. The switches 202 and 601 are preferably off. At that time, since the capacitor 102A holds charge accumulated in the period of the state shown in FIG. 7A, the charge is discharged. Therefore, a potential of the gate of the transistor 101 is increased, thereby gradually approaching a potential for holding the threshold voltage (a negative value) of the transistor 101 between the gate and source of the transistor 101. That is, a potential of the gate of the transistor 101 is approaching a potential which is lower than a potential supplied from the wiring 103 by the absolute value of the threshold voltage of the transistor 101. Then, at that time, a voltage between the gate and the source of the transistor 101 is approaching the threshold voltage of the transistor 101. Through the operation, the threshold voltage can be obtained.

Note that when charge in the capacitor 102A is discharged, almost complete discharge is possible. In that case, since current hardly flows into the transistor 101, the level of a voltage between the gate and the source of the transistor 101 is very close to the level of the threshold voltage of the transistor 101. Note that the discharge can be stopped before charge is completely discharged.

Note that, no big problem occurs when the length of the period changes in the case where charge in the capacitor 102A are discharged in this period. This is because, since charge is almost completely discharged after a certain length of time, influence on the operation is small even if the length of the period changes. Therefore, not line sequential driving but dot sequential driving can be applied to this operation. Thus, the structure can be realized with a simple structure of the driving circuit. Therefore, when a circuit illustrated in FIGS. 8A to 8F is one pixel, both a pixel portion provided with pixels in matrix and a driving circuit portion which supplies a signal to the pixel portion can be formed using the same kind of transistor or formed over the same substrate. However, the structure is not limited thereto. The cases where line sequential driving can be used and where the pixel portion and the driver circuit portion can be formed over different substrates are possible.

Figure 7C:
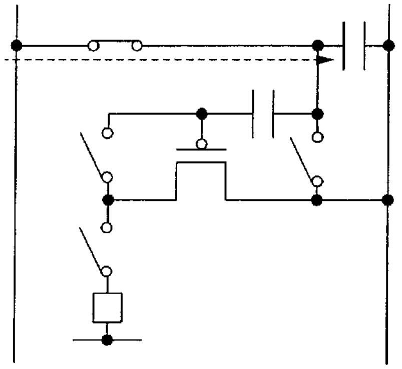

Then, in the period shown in FIG. 7C, a video signal (a video signal voltage) is input. The switch 601 is on. The switches 201, 202, and 203 are off. Then, a video signal is supplied from the wiring 104 to the capacitor 102B. At that time, a potential is decreased according to the video signal at a node where the second terminal of the capacitor 102A and the first terminal of the capacitor 102B are connected to each other. That is, a video signal voltage is input to the capacitor 102B. Then, a potential on the first terminal side of the capacitor 102A is decreased depending on the voltage held in the capacitor 102A due to capacitive coupling. Therefore, a potential of the gate of the transistor 101 is approaching the total potential of the video signal supplied from the wiring 104 and the threshold voltage (a negative value) of the transistor 101. Through the operation, input of the video signal (obtaining a video signal voltage) and obtaining the threshold voltage can be performed.

Through the operation, the total voltage of the voltage corresponding to the threshold voltage and the video signal voltage is supplied to the capacitor 102A, which leads to accumulation of charge corresponding to the voltage therein.

Figure 7D:
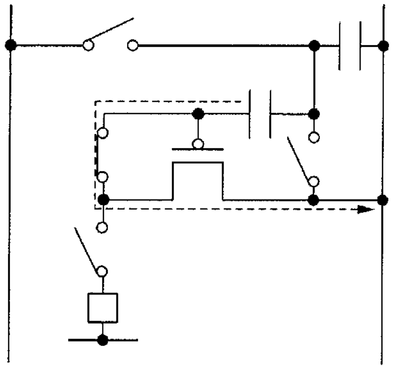

Then, in a period of the state shown in FIG. 7D, variation in current characteristics such as mobility of the transistor 101 is compensated. Note that the period corresponds to a period of the state shown in FIG. 1B. The switch 201 is on. The switches 202, 203, and 601 are off. With such a state, charge stored in the capacitors 102A and 102B are discharged through the transistor 101. In this manner, charge is slightly discharged through the transistor 101, so that influence of variation in current flowing into the transistor 101 can be reduced.

Figure 7E:
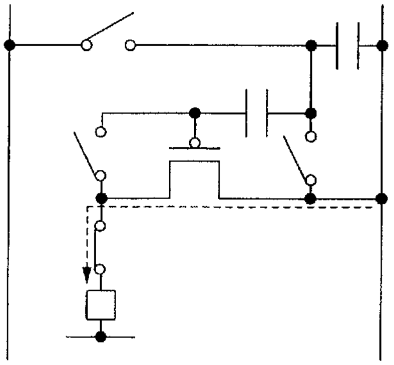

Then, in a period shown in FIG. 7E, current is supplied to the display element 105 through the transistor 101. Note that the period corresponds to a period of FIG. 1C. The switch 203 is on. The switches 201, 202, and 601 are off. At that time, the voltage between the gate and the source of the transistor 101 is the voltage obtained by the voltage which can be obtained by subtracting the voltage corresponding to current characteristics of the transistor 101 from the total of the voltage corresponding to the threshold voltage and a video signal voltage. Accordingly, influence of variation in current characteristics of the transistor 101 can be reduced, and an appropriate amount of current can be supplied to the display element 105.

Note that, in the case of a circuit structure in FIGS. 8C and 8D, a potential of the second terminal of the transistor 101 can be controlled through the switch 602 in the initialization period illustrated in FIG. 7A. Then, the switch 202 is preferably off. Initialization is performed through the switch 602, whereby current flowing into a display element side can be stopped. Note that, similarly, operation of FIG. 7B and the following operation may be performed.

Note that in FIGS. 7A to 7E, another operation or another period can be provided between the operations when one operation proceeds to a next operation. For example, the state as illustrated in FIG. 7D may be provided between the states in FIG. 7A and FIG. 7B. Since there is no harm in providing such a period, no problem occurs.

Note that the contents described with each drawing in this embodiment can be freely combined with or replaced with the contents described in another embodiment as appropriate.

Embodiment 3

In this embodiment, another specific example or deformation example of the circuit and driving method which are described in Embodiment 1.

Figure 11A:
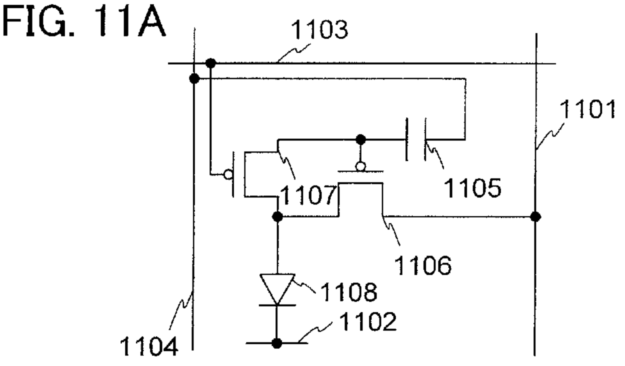
FIGS. 11A to 11C are diagrams each illustrating a circuit or a driving method shown in an embodiment.

Specific examples of FIGS. 1A to 1C, FIG. 9C, and FIG. 10C are illustrated in FIG. 11A. FIG. 11A shows a wiring 1101, a wiring 1102, a wiring 1103, a wiring 1104, a capacitor 1105, a transistor 1106, a transistor 1107, and a display element 1108. Note that the wiring 1101 corresponds to the wiring 103 of FIG. 9C. The wiring 1102 corresponds to the wiring 106 of FIG. 9C. Note that the wiring 1104 corresponds to the wiring 104 in FIG. 9C. Note that the capacitor 1105 corresponds to the capacitor 102B of FIG. 9C. Note that the transistor 1106 corresponds to the transistor 101 of FIG. 9C. The transistor 1107 corresponds to the display element 105 of FIG. 9C. Note that the transistors 1106 and 1107 are p-channel transistors in description below. Note that description will be made by using an EL element as an example of a display element.

Figure 11B:
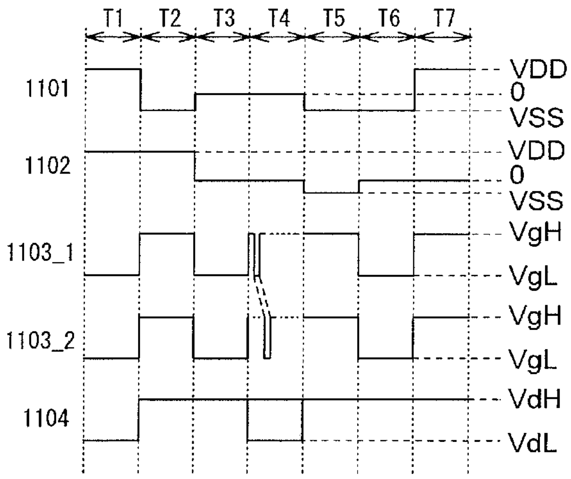

Operation of a circuit shown in FIG. 11A will be described on the basis of a timing chart shown in FIG. 11B. Then, in FIG. 11B, a potential of each wiring will be described by dividing the period of the timing chart into seven: a first period T1, a second period T2, a third period T3, a forth period T4, a fifth period T5, a sixth period T6, and a seventh period T7. Note that potentials of the wirings 1101 and 1102 have three phases: "VDD" (a signal on the basis of a high power supply potential, an H signal), "0" (a signal on the basis of a ground potential, GND), and "VSS" (a signal based on a low power supply potential, an L signal). In addition, the wiring 1103 can serve as a scan line of a display portion which actually has the wirings 1103_1 to 1103_N (N is a natural number) corresponding to the number of scan lines. In FIG. 11B, potentials of the wirings 1103_1 and 1103_2 have two phases: "VgH" and "VgL", in description below. Note that description is made focusing on the wiring 1103_1. In addition, the wiring 1104 can serve as a signal line of a display portion, and a potential of the wiring 1104 can take a value in the range from "VgH" to "VgL". Note that a potential of each wiring is not limited thereto. Other potential can be used if operation is not hampered.

The first period T1 is described. In the first period T1, the wiring 1101 has a potential of VDD, the wiring 1102 has a potential of VDD, the wiring 1103_1 has a potential of VgL, and the wiring 1104 has a potential of VdL. As a result, charge accumulated in the capacitor 1105 are discharged, so that a potential of each node is initialized. Then, the second period T2 is described. In the second period T2, the wiring 1101 has a potential of VSS, the wiring 1102 has a potential of VDD, the wiring 1103_1 has a potential of VgH, and the wiring 1104 has a potential of VdH. As a result, the capacitor 1105 is charged up. Then, the third period T3 is described. In the third period T3, the wiring 1101 has a potential of "0", the wiring 1102 has a potential of "0", the wiring 1103_1 has a potential of VgL, and the wiring 1104 has a potential of VdH. As a result, charge is discharged from the capacitor 1105, so that the threshold voltage of the transistor 1106 is held in parasitic capacitance between a gate and a source of the transistor 1106. That is, the third period T3 corresponds to a period (FIG. 1A) in which threshold voltage of a transistor is obtained. Then, the fourth period T4 is described. In the fourth period T4, the wiring 1101 has a potential of "0" and the wiring 1102 has a potential of "0". At that time, the wiring 1103_2 is scanned, subsequent to scanning the wiring 1103_1. Then, in the wiring 1104, a potential which is input to pixels is switched, and data is written to pixels. Then, the fifth period T5 is described. In the fifth period T5, the wiring 1101 has a potential of VSS, the wiring 1102 has a potential of VSS, the wiring 1103_1 has a potential of VgH, and the wiring 1104 has a potential of VdH. As a result, charge accumulated in the display element 1108 are initialized. Then, the sixth period T6 is described. In the sixth period T6, the wiring 1101 has a potential of VSS, the wiring 1102 has a potential of "0", the wiring 1103_1 has a potential of VgL, and the wiring 1104 has a potential of VdH. As a result, charge is discharged from the capacitor 1105 in accordance with variation in current characteristics such as mobility of the transistor, and variation in current characteristics such as mobility of the transistor 1106 is compensated. That is, the sixth period T6 corresponds to a period (FIG. 1B) for compensating current characteristics such as mobility of a transistor. Then, the seventh period T7 is described. In the seventh period T7, the wiring 1101 has a potential of VDD, the wiring 1102 has a potential of "0", the wiring 1103_1 has a potential of VgH, and the wiring 1104 has a potential of VdH. As a result, current flows into the display element 1108. That is, the seventh period T7 corresponds to a period (FIG. 1C) for display.

Note that the connection structure of the circuit is not limited thereto. As long as elements are provided so as to be able to desirably operate, various circuit structures can be realized by providing a switch, a transistor, or the like in various places.

Figure 11C:
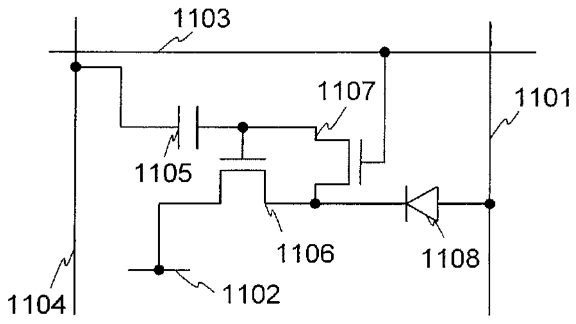

For example, a circuit where the transistors 1106 and 1107 are n-channel transistors is shown in FIG. 11C. When the polarities of the transistors 1106 and 1107 are reversed, it is preferable that a signal input to the wiring 1103 is reversed and used, and the display element 1108 is provided so as to be connect to the wiring 1101 in order to control on/off of the transistor 1107 serving as a switch.

In this manner, various structures can be shown as examples of the structure described in Embodiment 3. Further, specific examples of FIG. 1, FIG. 9C, and FIG. 10C are shown and a specific example can similarly be structured in another diagrams as FIGS. 1A to 1C, FIG. 9C, and FIG. 10C.

Note that in this embodiment, what is illustrated in the drawing can be freely combined with or replaced with what is described in other embodiments as appropriate.

Embodiment 4

In this embodiment, a specific example of the circuits described in Embodiments 1 to 3 will be described.

Figure 12:
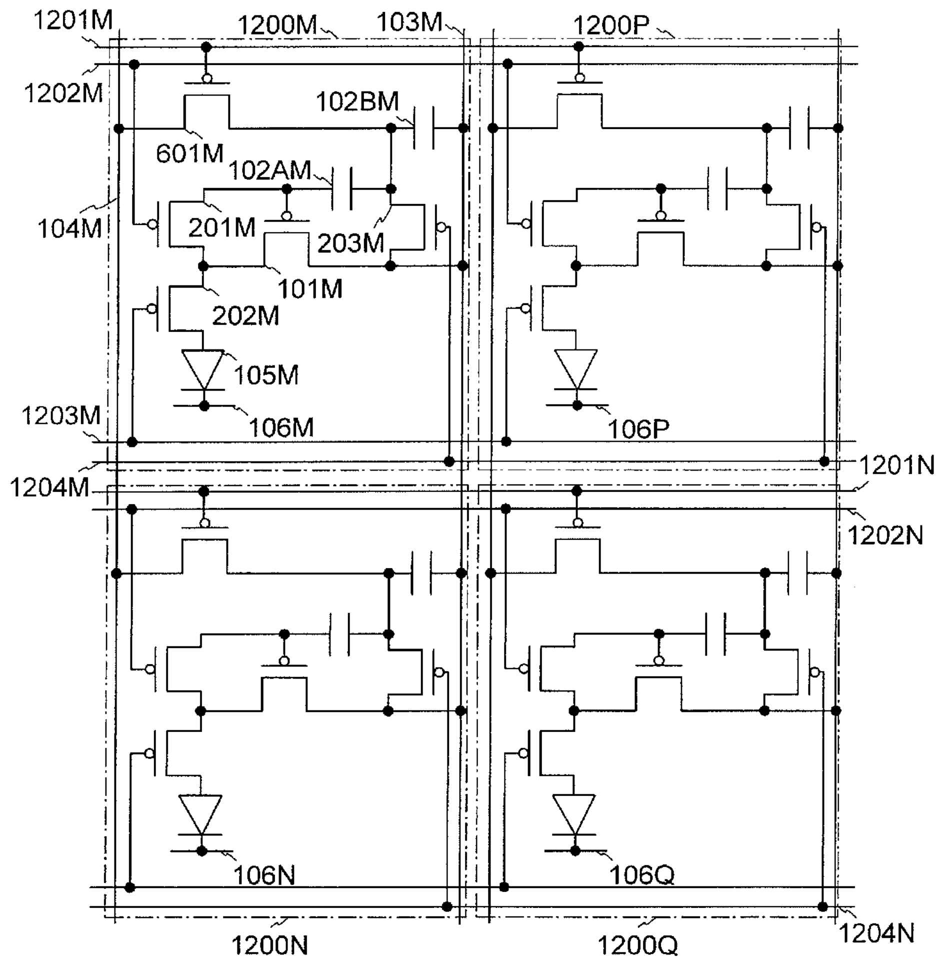
FIG. 12 is a diagram illustrating a circuit or a driving method shown in an embodiment.

As an example, FIG. 12 illustrates an example of the case where the circuit illustrated in FIG. 8A forms one pixel and the pixels are provided in matrix. A switch in FIG. 12 is realized by using a p-channel transistor. Note that this embodiment is not limited thereto. A transistor having the other polarity can be used. Transistors of both polarities can be used. Moreover, a diode, a diode-connected transistor, or the like can be used.

The circuit illustrated in FIG. 8A forms a pixel 1200M, which is one pixel. A pixel 1200N, a pixel 1200P, and a pixel 1200Q which are pixels having the same structure as the pixel 1200M are provided in matrix. Pixels which are arranged in column or are arranged in row are sometimes connected to the same wiring.

Next, correspondence between the elements in FIG. 8A and elements in the pixel 1200M is described below. The wiring 104 corresponds to a wiring 104M. The wiring 103 corresponds to a wiring 103M. The switch 601 corresponds to a transistor 601M. The switch 201 corresponds to a transistor 201M. The transistor 101 corresponds to a transistor 101M. The switch 202 corresponds to a transistor 202M. The switch 203 corresponds to a transistor 203M. The capacitor 102A corresponds to a capacitor 102AM. The capacitor 102B corresponds to a capacitor 102BM. The display element 105 corresponds to a light-emitting element 105M. The wiring 106 corresponds to a wiring 106M.

A gate of the transistor 601M is connected to a wiring 1201M. A gate of the transistor 201M is connected to a wiring 1202M. A gate of the transistor 202M is connected to a wiring 1203M. A gate of the transistor 203M is connected to a wiring 1204M.

Note that each wiring connected to the gate of the transistor can be connected to a wiring of another pixel or another wiring of the same pixel.

Note that the wiring 106M can be connected to a wiring 106P, a wiring 106N, and a wiring 106Q.

Various other circuits can be formed as in FIG. 12.

Note that in this embodiment, what is illustrated in the drawing can be freely combined with or replaced with what is described in other embodiments as appropriate.

Embodiment 5

Next, another structure example and driving method of a display device will be described. In this embodiment, a method is described by which an image for interpolating motion of an image (an input image) input from the outside of a display device is generated inside the display device on the basis of a plurality of input images and the generated image (the generation image) and the input image are sequentially displayed. Note that when an image for interpolating motion of an input image is a generation image, motion of moving images can be made smooth, and decrease in quality of moving images because of afterimages or the like due to hold driving can be suppressed. Here, moving image interpolation is described below. Ideally, display of moving images is realized by controlling the luminance of each pixel in real time; however, individual control of pixels in real time has problems such as the enormous number of control circuits, space for wirings, and the enormous amount of input image data. Thus, it is difficult to realize the individual control of pixels. Therefore, for display of moving images by a display device, a plurality of still images are sequentially displayed in a certain cycle so that display appears to be moving images. The cycle (in this embodiment, referred to as an input image signal cycle and denoted by $T_{in}$) is standardized, and for example, 1/60 second in NTSC and 1/50 second in PAL. Such a cycle does not cause a problem of moving image display in a CRT, which is an impulsive display device. However, in a hold-type display device, when moving images conforming to these standards are displayed without change, a defect (hold blur) in which display is blurred because of afterimages or the like due to hold driving occurs. Since hold blur is recognized by discrepancy between unconscious motion interpolation due to human eye tracking and hold-type display, the hold blur can be reduced by making the input image signal cycle shorter than that in conventional standards (by making the control closer to individual control of pixels in real time). However, it is difficult to reduce the length of the input image signal cycle because the standard needs to be changed and the amount of data is increased. However, when an image for interpolating motion of an input image is generated inside the display device on the basis of a standardized input image signal and display is performed while the generation image interpolates the input image, hold blur can be reduced without change in the standard or increase in the amount of data. Operation such that an image signal is generated inside the display device on the basis of an input image signal to interpolate motion of the input image is referred to as moving image interpolation.

Figure 13A:
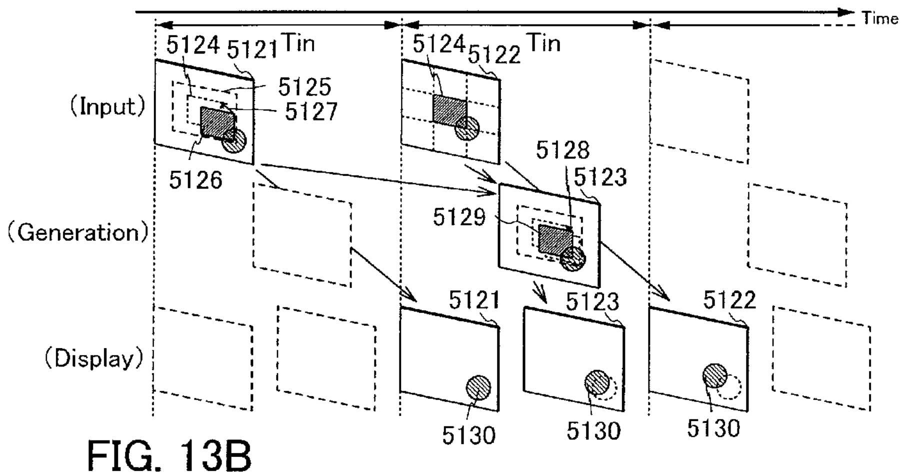
FIGS. 13A to 13C are cross sectional views each illustrating a driving method shown in an embodiment.
Figure 13B:
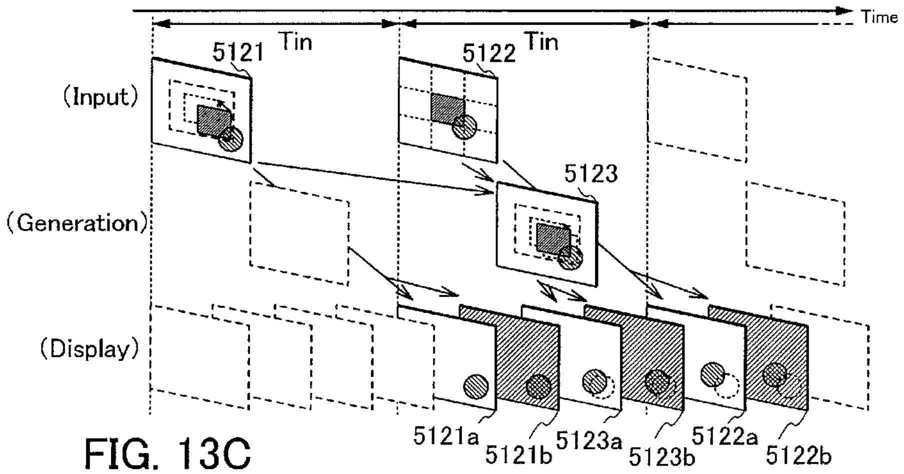

By a method for interpolating moving images in this embodiment, motion blur can be reduced. The method for interpolating moving images in this embodiment can include an image generation method and an image display method. Further, by using a different image generation method and/or a different image display method for motion with a specific pattern, motion blur can be effectively reduced. FIGS. 13A and 13B are schematic diagrams each illustrating an example of a method for interpolating moving images in this embodiment. FIGS. 13A and 13B each illustrate timing of treating each image by using the position of the horizontal direction, with the time as the horizontal axis. A portion represented as "input" indicates timing at which an input image signal is input. Here, images 5121 and 5122 are focused as two images that are temporally adjacent to each other. An input image is input at an interval of the cycle $T_{in}$. Note that the length of one cycle $T_{in}$ is referred to as one frame or one frame period in some cases. A portion represented as "generation" indicates timing at which a new image is generated from an input image signal. Here, an image 5123 which is a generation image generated on the basis of the images 5121 and 5122 is focused. A portion represented as "display" indicates timing at which an image is displayed in the display device. Note that images other than the focused images are only represented by dashed lines, and by treating such images in a manner similar to that of the focused images, the example of the method for interpolating moving images in this embodiment can be realized.

In the example of the method for interpolating moving images in this embodiment, as illustrated in FIG. 13A, a generation image which is generated on the basis of two input images that are temporally adjacent is displayed in a period after one image is displayed until the other image is displayed, so that moving image interpolation can be performed. In this case, a display cycle of a display image is preferably half of an input cycle of the input image. Note that the display cycle is not limited thereto and can be a variety of display cycles. For example, when the length of the display cycle is smaller than half of that of the input cycle, moving images can be displayed more smoothly. Alternatively, when the length of the display cycle is larger than half of that of the input cycle, power consumption can be reduced. Note that here, an image is generated on the basis of two input images which are temporally adjacent; however, the number of input images to be used is not limited to two and can be other numbers. For example, when an image is generated on the basis of three (or more than three) input images which are temporally adjacent, a generation image with higher accuracy can be obtained as compared to the case where an image is generated on the basis of two input images. Note that the display timing of the image 5121 is the same as the input timing of the image 5122, that is, the display timing is one frame later than the input timing. However, the display timing in the method for interpolating moving images in this embodiment is not limited thereto and can be a variety of display timings. For example, the display timing can be delayed with respect to the input timing by more than one frame. Thus, the display timing of the image 5123 which is the generation image can be delayed, which allows enough time to generate the image 5123 and leads to reduction in power consumption and manufacturing cost. Note that when the display timing is significantly delayed with respect to the input timing, a period for holding an input image becomes longer, and the memory capacity for holding the input image is increased. Therefore, the display timing is preferably delayed with respect to the input timing by approximately one to two frames.

Here, an example of a specific generation method of the image 5123, which is generated on the basis of the images 5121 and 5122, is described. It is necessary to detect motion of an input image in order to interpolate moving images. In this embodiment, a method called a block matching method can be used in order to detect motion of an input image. Note that this embodiment is not limited thereto, and a variety of methods (e.g., a method for obtaining a difference of image data or a method using Fourier transformation) can be used. In the block matching method, first, image data for one input image (here, image data of the image 5121) is stored in a data storage unit (e.g., a memory circuit such as a semiconductor memory or a RAM). Then, an image in the next frame (here, the image 5122) is divided into a plurality of regions. Note that the divided regions can have the same rectangular shapes as illustrated in FIG. 13A; however, the divided regions are not limited to them and can have a variety of shapes (e.g., the shape or size varies depending on images). After that, in each divided region, data is compared to the image data in the previous frame (here, the image data of the image 5121), which is stored in the data storage unit, so that a region where the image data is similar to each other is searched. FIG. 13A illustrates an example in which the image 5121 is searched for a region where data is similar to that of a region 5124 in the image 5122, and a region 5126 is found. Note that a search range is preferably limited when the image 5121 is searched. In the example of FIG. 13A, a region 5125 which is approximately four times as large as the region 5124 is set as the search range. By making the search range larger than this, detection accuracy can be increased even in a moving image with high-speed motion. Note that search in an excessively wide range needs an enormous amount of time, which makes it difficult to realize detection of motion. Thus, the region 5125 is preferably approximately two to six times as large as the area of the region 5124. After that, a difference of the position between the searched region 5126 and the region 5124 in the image 5122 is determined to be a motion vector 5127. The motion vector 5127 represents motion of image data in the region 5124 in one frame period. Then, in order to generate an image showing the intermediate state of motion, an image generation vector 5128 obtained by changing the size of the motion vector without change in the direction thereof is generated, and image data included in the region 5126 of the image 5121 is moved in accordance with the image generation vector 5128, so that image data in a region 5129 of the image 5123 is generated. By performing a series of processings on the entire region of the image 5122, the image 5123 can be generated. Then, by sequentially displaying the input image 5121, the generation image 5123, and the input image 5122, moving images can be interpolated. Note that the position of an object 5130 in the image is different (i.e., the object is moved) between the images 5121 and 5122. In the generated image 5123, the object is located at the midpoint between the object in the image 5121 and the object in the image 5122. By displaying such images, motion of moving images can be made smooth, and blur of moving images due to afterimages or the like can be reduced.

Note that the size of the image generation vector 5128 can be determined in accordance with the display timing of the image 5123. In the example of FIG. 13A, since the display timing of the image 5123 is the midpoint (½) between the display timings of the images 5121 and 5122, the size of the image generation vector 5128 is half of that of the motion vector 5127. Alternatively, for example, when the display timing is ⅓ between the display timings of the images 5121 and 5122, the size of the image generation vector 5128 can be ⅓, and when the display timing is ⅔ between the display timings of the images 5121 and 5122, the size of the image generation vector 5128 can be ⅔.

Note that in the case where a new image is generated by moving a plurality of regions having different motion vectors in this manner, a portion where one region has already been moved to a region that is a destination for another region or a portion to which any region is not moved is generated in some cases (i.e., overlap or blank occurs in some cases). For such portions, data can be compensated. As a method for compensating an overlap portion, a method by which overlap data is averaged; a method by which data is arranged in order of priority according to the direction of motion vectors or the like, and high-priority data is used as data in a generation image; or a method by which one of color and brightness is arranged in order of priority and the other thereof is averaged can be used, for example. As a method for compensating a blank portion, a method by which image data of the portion of the image 5121 or the image 5122 is used as data in a generation image without modification, a method by which image data of the portion of the image 5121 or the image 5122 is averaged, or the like can be used. Then, the generated image 5123 is displayed at the timing in accordance with the size of the image generation vector 5128, so that motion of moving images can be made smooth, and the decrease in quality of moving images because of afterimages or the like due to hold driving can be suppressed.

In another example of the method for interpolating moving images in this embodiment, as illustrated in FIG. 13B, when a generation image which is generated on the basis of two input images that are temporally adjacent is displayed in a period after one image is displayed until the other image is displayed, each display image is divided into a plurality of subimages to be displayed. Thus, moving images can be interpolated. This case can have advantages of displaying a dark image at regular intervals (advantages of making a display method closer to impulsive display) in addition to advantages of a shorter image display cycle. In other words, blur of moving images due to afterimages or the like can be further reduced as compared to the case where the length of the image display cycle is just made to half of that of the image input cycle. In the example of FIG. 13B, "input" and "generation" can be similar to the processing in the example of FIG. 13A; therefore, the description thereof is not repeated. For "display" in the example of FIG. 13B, one input image and/or one generation image can be divided into a plurality of subimages to be displayed. Specifically, as illustrated in FIG. 13B, the image 5121 is divided into subimages **5121*a* and 5121*b* and the subimages 5121*a* and 5121*b* are sequentially displayed so as to make human eyes perceive that the image 5121 is displayed; the image 5123 is divided into subimages 5123*a* and 5123*b* and the subimages 5123*a* and 5123*b* are sequentially displayed so as to make human eyes perceive that the image 5123 is displayed; and the image 5122 is divided into subimages 5122*a* and 5122*b* and the subimages 5122*a* and 5122*b* are sequentially displayed so as to make human eyes perceive that the image 5122 is displayed. That is, the display method can be made closer to impulsive display while the images perceived by human eyes are similar to those in the example of FIG. 13A, so that blur of moving images due to afterimages or the like can be further reduced. Note that the number of division of subimages is two in FIG. 13B; however, the number of division of subimages is not limited thereto and can be other numbers. Note that subimages are displayed at regular intervals (½) in FIG. 13B; however, timing of displaying subimages is not limited thereto and can be a variety of timings. For example, when timing of displaying dark subimages (5121*b*, 5122*b*, and 5123*b***) is made earlier (specifically, timing at ¼ to ½), the display method can be made much closer to impulsive display, so that blur of moving images due to afterimages or the like can be further reduced. Alternatively, when the timing of displaying the dark subimages is delayed (specifically, timing at ½ to ¾), the length of a period for displaying a bright image can be increased, so that the display efficiency can be increased and power consumption can be reduced.

Figure 13C:
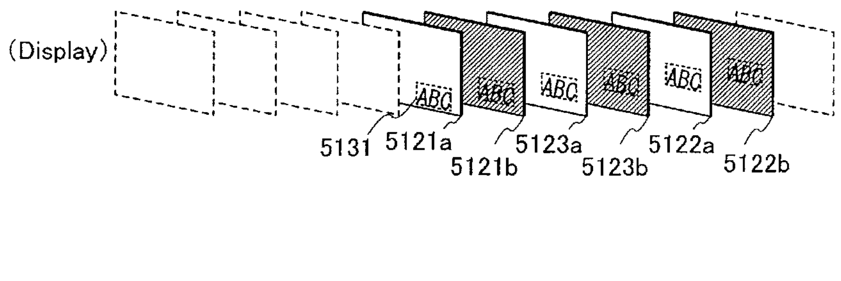

Another example of the method for interpolating moving images in this embodiment is an example in which the shape of an object which is moved in an image is detected and different processings are performed depending on the shape of the moving object. FIG. 13C shows display timing as in the example of FIG. 13B and illustrates the case where moving letters (also referred to as scrolling texts, subtitles, captions, or the like) are displayed. Note that since "input" and "generation" may be similar to those in FIG. 13B, they are not illustrated in FIG. 13C. The amount of blur of moving images by hold driving varies depending on properties of a moving object in some cases. In particular, blur is often recognized remarkably when letters are moved. This is because eyes track moving letters to read the letters, so that hold blur is likely to occur. Further, since letters often have clear outlines, blur due to hold blur is further emphasized in some cases. That is, determining whether an object which is moved in an image is a letter and performing special processing when the object is the letter are effective in reducing hold blur. Specifically, when edge detection, pattern detection, and/or the like are/is performed on an object which is moved in an image and the object is determined to be a letter, motion compensation is performed even on subimages generated by division of one image so that an intermediate state of motion is displayed. Thus, motion can be made smooth. In the case where the object is determined not to be a letter, when subimages are generated by division of one image, the subimages can be displayed without change in the position of the moving object as illustrated in FIG. 13B. FIG. 13C illustrates the example in which a region 5131 which is determined to be letters is moved upward, and the position of the region 5131 is different between the images 5121*a* and 5121*b*. Similarly, the position of the region 5131 is different between the images 5123*a* and 5123*b*, and between the images 5122*a* and 5122*b*. Accordingly, motion of letters for which hold blur is particularly easily recognized can be made smoother than that by normal motion compensation frame rate doubling, so that blur of moving images due to afterimages or the like can be further reduced.

Note that in this embodiment, what is illustrated in the drawing can be freely combined with or replaced with what is described in other embodiments as appropriate.

Embodiment 6

In this embodiment, an example of a display device will be described.

First, an example of a system block of a liquid crystal display device is described with reference to FIG. 14A. The liquid crystal display device includes a circuit 5361, a circuit 5362, a circuit 5363_1, a circuit 5363_2, a pixel portion 5364, a circuit 5365, and a lighting device 5366. A plurality of wirings 5371 which are extended from the circuit 5362 and a plurality of wirings 5372 which are extended from the circuits 5363_1 and 5363_2 are provided in the pixel portion 5364. Moreover, pixels 5367 which include display elements such as liquid crystal elements are provided in matrix in respective regions where the plurality of wirings 5371 and the plurality of wirings 5372 intersect with each other.

The circuit 5361 has a function of supplying a signal, voltage, current, or the like to the circuit 5362, the circuit 5363_1, the circuit 5363_2, and the circuit 5365 in response to a video signal 5360 and can function as a controller, a control circuit, a timing generator, a power supply circuit, a regulator, or the like. In this embodiment, for example, the circuit 5361 supplies a signal line driver circuit start signal (SSP), a signal line driver circuit clock signal (SCK), a signal line driver circuit inverted clock signal (SCKB), video signal data (DATA), or a latch signal (LAT) to the circuit 5362. Alternatively, as an example, the circuit 5361 supplies a scan line driver circuit start signal (GSP), a scan line driver circuit clock signal (GCK), or a scan line driver circuit inverted clock signal (GCKB) to the circuit 5363_1 and the circuit 5363_2. Further alternatively, the circuit 5361 supplies a backlight control signal (BLC) to the circuit 5365. Note that this embodiment is not limited thereto, and the circuit 5361 can supply various other signals, voltages, currents, or the like to the circuit 5362, the circuit 5363_1, the circuit 5363_2, and the circuit 5365.

The circuit 5362 has a function of outputting video signals to the plurality of wirings 5371 in response to a signal supplied from the circuit 5361 (e.g., SSP, SCK, SCKB, DATA, or LAT), and can function as a signal line driver circuit. The circuit 5363_1 and the circuit 53632 each have a function of outputting scan signals to the plurality of wirings 5372 in response to a signal supplied from the circuit 5361 (e.g., GSP, GCK, or GCKB), and can function as a scan line driver circuit. The circuit 5365 has a function of controlling the luminance (or the average luminance) of the lighting device 5366 by controlling the amount of electric power supplied to the lighting device 5366, time to supply the electric power to the lighting device 5366, or the like in accordance with the signal (BLC) supplied from the circuit 5361. The circuit 5365 can function as a power supply circuit.

Note that when video signals are input to the plurality of wirings 5371, the plurality of wirings 5371 can function as signal lines, video signal lines, source lines, or the like. When scan signals are input to the plurality of wirings 5372, the plurality of wirings 5372 can function as signal lines, scan lines, gate lines, or the like. Note that this embodiment is not limited thereto.

Note that when the same signal is input to the circuit 5363_1 and the circuit 53632 from the circuit 5361, scan signals output from the circuit 5363_1 to the plurality of wirings 5372 and scan signals output from the circuit 5363_2 to the plurality of wirings 5372 have approximately the same timings in many cases. Accordingly, load caused by driving of the circuits 5363_1 and 5363_2 can be reduced. Thus, the display device can be made larger. Alternatively, the display device can have higher definition. Alternatively, since the channel width of transistors included in the circuits 5363_1 and 5363_2 can be reduced, a display device with a narrower frame can be obtained. Note that this embodiment is not limited thereto, and the circuit 5361 can supply different signals to the circuit 5363_1 and the circuit 5363_2.

Note that one of the circuit 5363_1 and the circuit 5363_2 can be eliminated.

Note that a wiring such as a capacitor line, a power supply line, or a scan line can be additionally provided in the pixel portion 5364. Then, the circuit 5361 can output a signal, a voltage, or the like to such a wiring. Further, a circuit similar to the circuit 5363_1 or the circuit 5363_2 can be additionally provided. The additionally provided circuit can output a signal such as a scan signal to the additionally provided wiring.

Note that the pixel 5367 can include a light-emitting element such as an EL element as a display element. In that case, as illustrated in FIG. 14B, since the display element can emit light, the circuit 5365 and the lighting device 5366 can be eliminated. Moreover, in order to supply electric power to the display element, a plurality of wirings 5373 which can function as power supply lines can be provided in the pixel portion 5364. The circuit 5361 can apply a power supply voltage called voltage (ANO) to the wirings 5373. The wirings 5373 can be separately connected to the pixels in accordance with color elements or can be connected to all the pixels.

Note that FIG. 14B illustrates an example in which the circuit 5361 supplies different signals to the circuit 5363_1 and the circuit 5363_2. The circuit 5361 supplies a signal such as a scan line driver circuit start signal (GSP1), a scan line driver circuit clock signal (GCK1), or a scan line driver circuit inverted clock signal (GCKB1) to the circuit 5363_1. In addition, the circuit 5361 supplies a signal such as a scan line driver circuit start signal (GSP2), a scan line driver circuit clock signal (GCK2), or a scan line driver circuit inverted clock signal (GCKB2) to the circuit 5363_2. In that case, the circuit 5363_1 can scan only wirings in odd-numbered rows of the plurality of wirings 5372 and the circuit 5363_2 can scan only wirings in even-numbered rows of the plurality of wirings 5372. Accordingly, the driving frequency of the circuit 5363_1 and the circuit 53632 can be lowered, whereby power consumption can be reduced. Alternatively, the area in which a flip-flop of one stage can be laid out can be made larger. Thus, a display device can have higher definition. Alternatively, the size of a display device can be increased. Note that this embodiment is not limited thereto, and the circuit 5361 can output the same signal to the circuit 5363_1 and the circuit 5363_2 as in FIG. 14A.

Figure 14A:
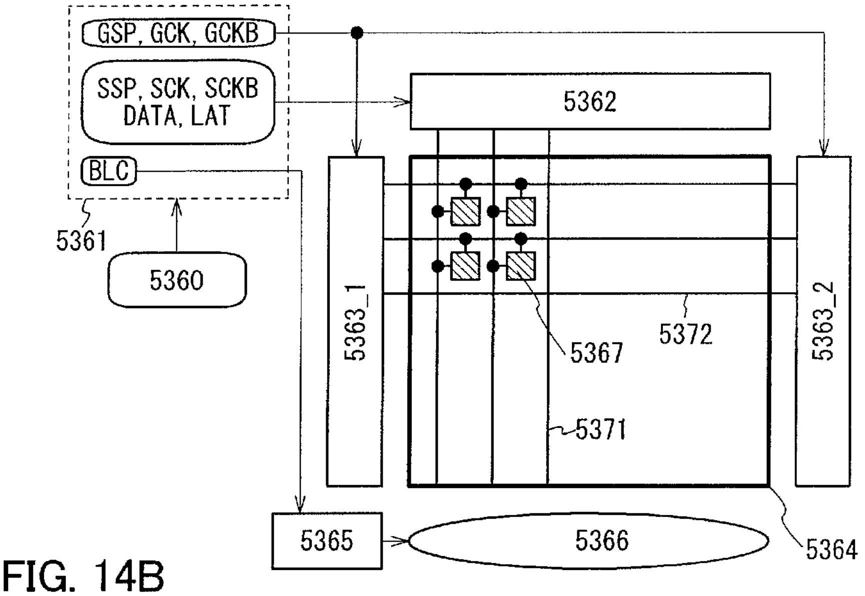
FIGS. 14A and 14B are cross sectional views each illustrating a block diagram shown in an embodiment.
Figure 14B:
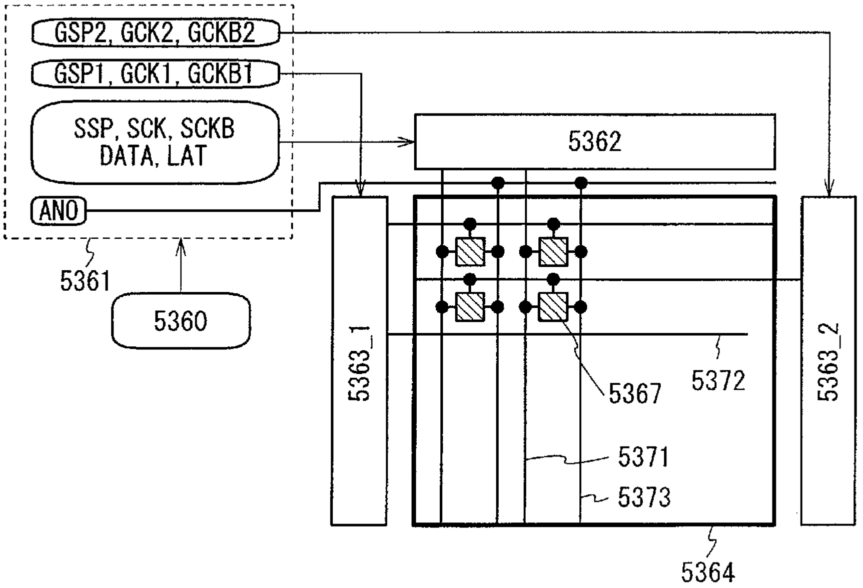

Note that as in FIG. 14B, the circuit 5361 can supply different signals to the circuit 5363_1 and the circuit 5363_2 in FIG. 14A.

The above is the description of one example of the system block of the display device.

Next, examples of structures of the display device will be described with reference to FIGS. 15A to 15E.

Figure 15A:
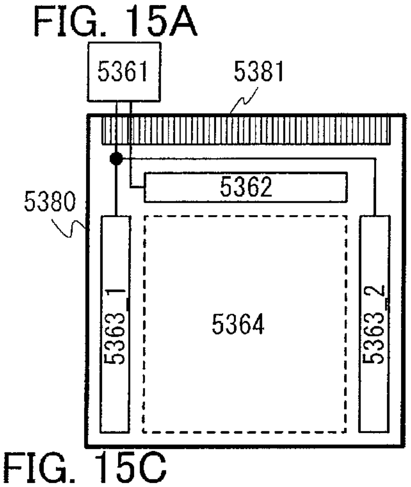
FIGS. 15A to 15E are cross sectional views each illustrating a block diagram shown in an embodiment.

In FIG. 15A, circuits which have a function of outputting signals to the pixel portion 5364 (e.g., the circuit 5362, the circuit 5363_1, and the circuit 5363_2) are formed over a substrate 5380 where the pixel portion 5364 is also formed. In addition, the circuit 5361 is formed over a substrate which is different from the substrate where the pixel portion 5364 is formed. In this manner, since the number of external components is reduced, reduction in cost can be achieved. Alternatively, since the number of signals or voltages input to the substrate 5380 is reduced, the number of connections between the substrate 5380 and the external component can be reduced. Accordingly, improvement in reliability or increase in yield can be achieved.

Note that in the case where the circuit is formed over a substrate which is different from the substrate where the pixel portion 5364 is formed, the substrate can be mounted on a flexible printed circuit (FPC) by tape automated bonding (TAB). Alternatively, the substrate can be mounted on the same substrate 5380 as the pixel portion 5364 by chip on glass (COG).

In the case where the circuit is formed over a different substrate from the pixel portion 5364, a transistor formed using a single crystal semiconductor can be formed on the substrate. Therefore, the circuit formed over the substrate can have advantages such as improvement in driving frequency, improvement in driving voltage, or reduction of variation in output signals.

Note that a signal, voltage, current, or the like is input from an external circuit through an input terminal 5381 in many cases.

Figure 15B:
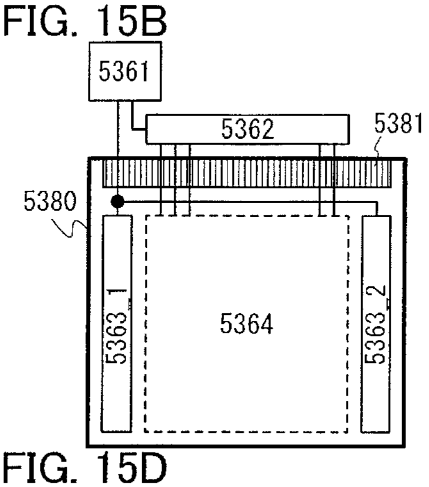

In FIG. 15B, circuits with low driving frequency (e.g., the circuit 5363_1 and the circuit 5363_2) are formed over the substrate 5380 where the pixel portion 5364 is formed. In addition, the circuit 5361 and the circuit 5362 are formed over a substrate which is different from the substrate where the pixel portion 5364 is formed. In this manner, the circuit formed over the substrate 5380 can be constituted by transistors with low mobility. Thus, a non-single-crystal semiconductor, a microcrystalline semiconductor, an organic semiconductor, an oxide semiconductor, or the like can be used for a semiconductor layer of the transistor. Accordingly, increase in the size of the display device, reduction in the number of steps, reduction in cost, improvement in yield, or the like can be achieved.

Figure 15C:
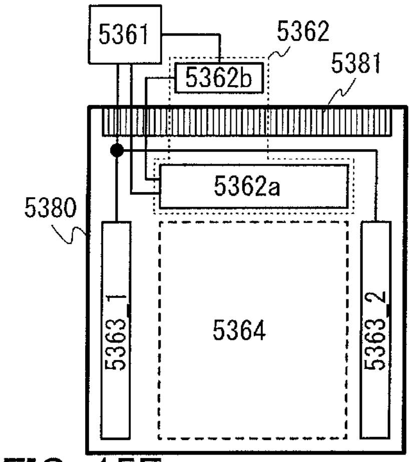

Note that as illustrated in FIG. 15C, part of the circuit 5362 (a circuit 5362*a*) can be formed over the substrate 5380 where the pixel portion 5364 is formed, and the other part of the circuit 5362 (a circuit 5362*b*) can be formed over a substrate which is different from the substrate where the pixel portion 5364 is formed. The circuit 5362*a* often includes a circuit which can be formed using a transistor with low mobility (e.g., a shift register, a selector, or a switch). The circuit 5362*b* often includes a circuit which is preferably formed using a transistor with high mobility and few variations in characteristics (e.g., a shift register, a latch circuit, a buffer circuit, a DA converter circuit, or an AD converter circuit). Accordingly, as in FIG. 15B, a non-single-crystal semiconductor, a microcrystalline semiconductor, an organic semiconductor, an oxide semiconductor, or the like can be used for a semiconductor layer of the transistor. Further, the number of external components can be reduced.

Figure 15D:
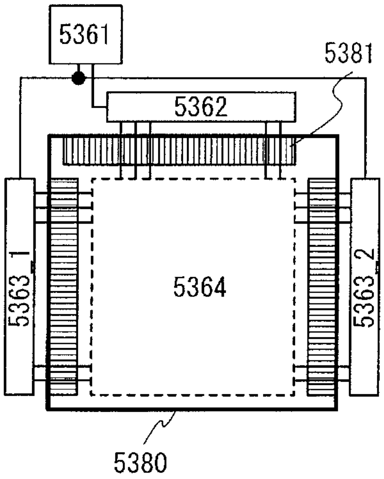

In FIG. 15D, circuits which have a function of outputting signals to the pixel portion 5364 (e.g., the circuit 5362, the circuit 5363_1, and the circuit 5363_2) and a circuit which has a function of controlling these circuits (e.g., the circuit 5361) are formed over a substrate which is different from the substrate where the pixel portion 5364 is formed. In this manner, since the pixel portion and the peripheral circuits can be formed over different substrates, improvement in yield can be achieved.

Note that in FIGS. 15A to 15C, as in FIG. 15D, the circuit 5363_1 and the circuit 5363_2 can be formed over a substrate which is different from the substrate where the pixel portion 5364 is formed.

Figure 15E:
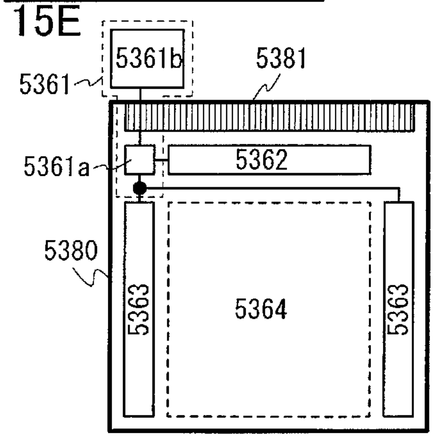

In FIG. 15E, part of the circuit 5361 (a circuit 5361*a*) is formed over the substrate 5380 over which the pixel portion 5364 is formed, and the other part of the circuit 5361 (a circuit 5361*b*) is formed over a substrate which is different from the substrate where the pixel portion 5364 is formed. The circuit 5361*a* often includes a circuit which can be formed using a transistor with low mobility (e.g., a switch, a selector, or a level shift circuit). Moreover, the circuit 5361*b* often includes a circuit which is preferably formed using a transistor with high mobility and few variations in characteristics (e.g., a shift register, a timing generator, an oscillator, a regulator, or an analog buffer).

Note that also in FIGS. 15A to 15D, the circuit 5361*a* can be formed over the same substrate as the pixel portion 5364, and the circuit 5361*b* can be formed over a substrate which is different from the substrate where the pixel portion 5364 is formed.

Note that in this embodiment, what is illustrated in the drawing can be freely combined with or replaced with what is described in other embodiments as appropriate.

Embodiment 7

In this embodiment, an example of steps for manufacturing a transistor and a capacitor will be described. In particular, manufacturing steps in which an oxide semiconductor is used for a semiconductor layer will be described. As an oxide semiconductor layer, a layer represented by $InMO_3(ZnO)_m$ (m>0) can be used. Note that M represents one or more of metal elements selected from Ga, Fe, Ni, Mn, and Co. As an example, only Ga may be contained as M, or any of the above metal elements in addition to Ga, for example, Ga and Ni or Ga and Fe may be contained as M. Note that the oxide semiconductor may contain a transition metal element such as Fe or Ni or oxide of the transition metal element as an impurity element in addition to the metal element contained as M. Such a thin film can be referred to as an In—Ga—Zn—O-based non-single-crystal film. As the oxide semiconductor, ZnO can be used. Note that the concentration of mobile ions in the oxide semiconductor layer, typically sodium, is preferably $5\times10^{18}/cm^3$ or less, more preferably $1\times10^{18}/cm^3$ or less so as to suppress change in electric characteristics of a transistor. Note that this embodiment is not limited thereto, and various other oxide semiconductor materials can be used for a semiconductor layer. Alternatively, for the semiconductor layer, a single crystal semiconductor, a polycrystalline semiconductor, a microcrystalline (microcrystal or nanocrystal) semiconductor, an amorphous semiconductor, various non-single-crystal semiconductors, or the like can be used.

Figure 16A:
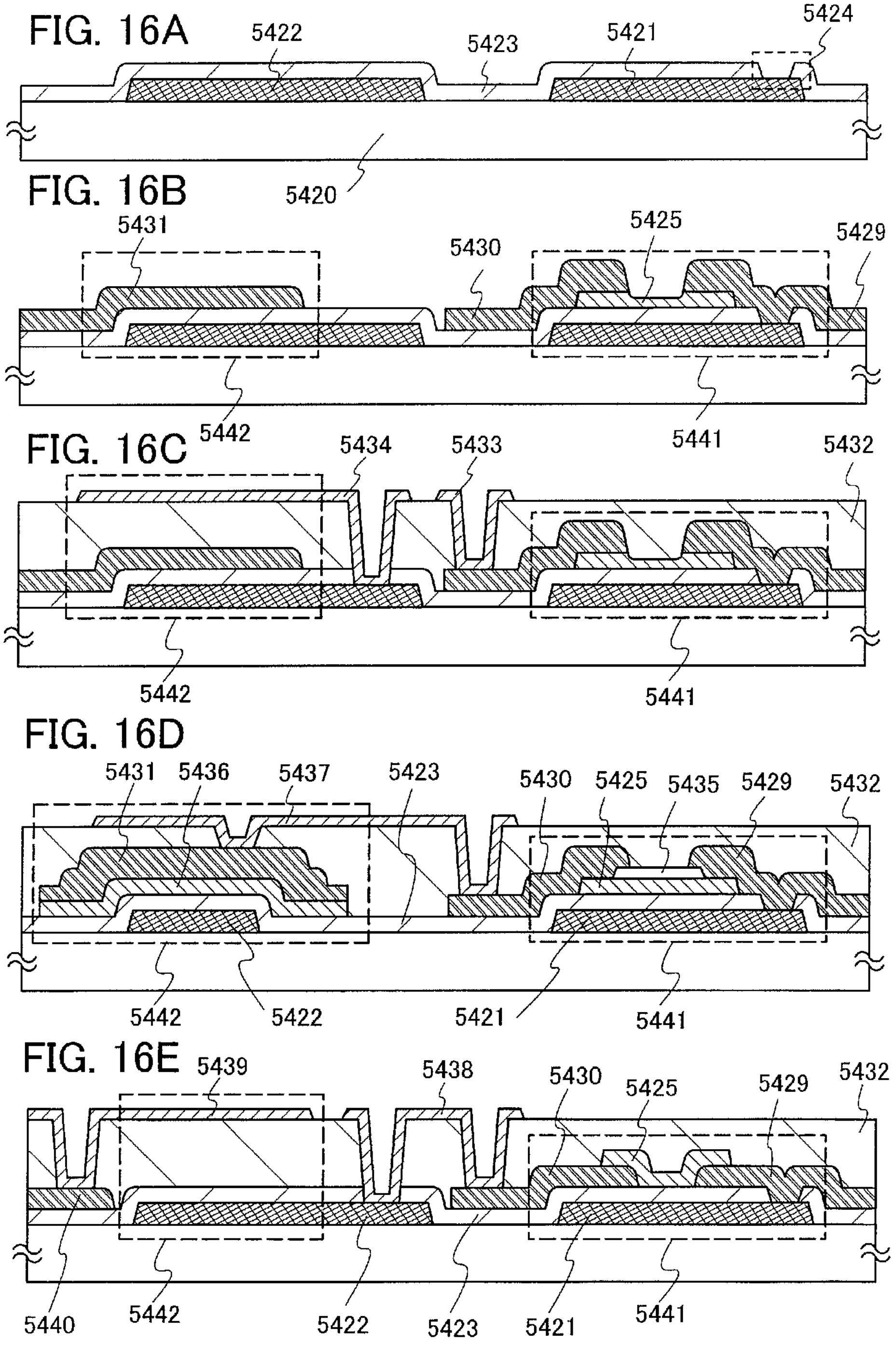

An example of steps for manufacturing a transistor and a capacitor is described with reference to FIGS. 16A to 16C. FIGS. 16A to 16C illustrate an example of steps for manufacturing a transistor 5441 and a capacitor 5442. The transistor 5441 is an example of an inverted staggered thin film transistor, in which a wiring is provided over an oxide semiconductor layer with a source electrode or a drain electrode therebetween.

First, a first conductive layer is formed over the entire surface of a substrate 5420 by a sputtering method. Next, the first conductive layer is selectively etched by using a resist mask formed through a photolithography process using a first photomask, so that a conductive layer 5421 and a conductive layer 5422 are formed. The conductive layer 5421 can function as a gate electrode. The conductive layer 5422 can function as one electrode of the capacitor. Note that this embodiment is not limited thereto, and each of the conductive layers 5421 and 5422 can include a portion functioning as a wiring, a gate electrode, or an electrode of the capacitor. After that, the resist mask is removed.

Next, an insulating layer 5423 is formed over the entire surface by a plasma CVD method or a sputtering method. The insulating layer 5423 can function as a gate insulating layer and is formed so as to cover the conductive layers 5421 and 5422. Note that the thickness of the insulating layer 5423 is often in the range of 50 nm to 250 nm.

When a silicon oxide layer is used as the insulating layer 5423, the silicon oxide layer can be formed by a CVD method using an organosilane gas. As the organosilane gas, yttrium oxide ($Y_2O_3$) or the following silicon-containing compound can be used: tetraethyl orthosilicate (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$).

Then, the insulating layer 5423 is selectively etched by using a resist mask formed through a photolithography process using a second photomask, so that a contact hole 5424 which reaches the conductive layer 5421 is formed. After that, the resist mask is removed. Note that this embodiment is not limited thereto, and the contact hole 5424 can be eliminated. Alternatively, the contact hole 5424 can be formed after an oxide semiconductor layer is formed. A cross-sectional view of the steps so far corresponds to FIG. 16A.

Next, an oxide semiconductor layer is formed over the entire surface by a sputtering method. Note that this embodiment is not limited thereto, and it is possible to form the oxide semiconductor layer by a sputtering method and to form an $n^+$ layer thereover. Note that the thickness of the oxide semiconductor layer is often in the range of 5 nm to 200 nm.

Before the oxide semiconductor layer is formed by a sputtering method, reverse sputtering in which plasma is generated by introduction of an argon gas is preferably performed. By the reverse sputtering, dust attached to a surface of the insulating layer 5423 and a bottom surface of the contact hole 5424 can be removed. The reverse sputtering is a method in which voltage is applied to a substrate side, not to a target side, in an argon atmosphere by using an RF power supply and plasma is generated so that a substrate surface is modified. Note that this embodiment is not limited thereto, and nitrogen, helium, or the like can be used instead of the argon atmosphere. Alternatively, the reverse sputtering can be performed in an atmosphere where oxygen, $N_2O$, or the like is added to the argon atmosphere or in an atmosphere where $Cl_2$, $CF_4$, or the like is added to the argon atmosphere. Note that by the reverse sputtering, the thickness of the insulating layer 5423 is reduced from the surface by preferably approximately 2 nm to 10 nm. Formation of the oxide semiconductor layer without exposure to air after such plasma treatment is effective in preventing dust or moisture from being attached to the interface between the gate insulating layer and the oxide semiconductor layer.

Then, the oxide semiconductor layer is selectively etched using a third photomask. After that, a resist mask is removed.

Next, a second conductive layer is formed over the entire surface by a sputtering method. Then, the second conductive layer is selectively etched by using a resist mask formed through a photolithography process using a fourth photomask, so that a conductive layer 5429, a conductive layer 5430, and a conductive layer 5431 are formed. The conductive layer 5429 is connected to the conductive layer 5421 through the contact hole 5424. The conductive layers 5429 and 5430 can function as the source electrode and the drain electrode. The conductive layer 5431 can function as the other electrode of the capacitor. Note that this embodiment is not limited thereto, and each of the conductive layers 5429, 5430, and 5431 can include a portion functioning as a wiring, the source or drain electrode, or the electrode of the capacitor.

Note that if heat treatment (e.g., at 200° C. to 600° C.) is performed in a subsequent step, the second conductive layer preferably has heat resistance high enough to withstand the heat treatment. Accordingly, for the second conductive layer, Al and a heat-resistant conductive material (e.g., an element such as Ti, Ta, W, Mo, Cr, Nd, Sc, Zr, or Ce; an alloy in which these elements are combined; or nitride containing any of these elements) are preferably used in combination. Note that this embodiment is not limited thereto, and by employing a layered structure, the second conductive layer can have heat resistance. For example, it is possible to provide a film of a heat-resistant conductive material such as Ti or Mo above and below an Al film.

Before the second conductive layer is formed by a sputtering method, reverse sputtering in which plasma is generated by introduction of an argon gas is preferably performed so that dust attached to the surface of the insulating layer 5423, a surface of the oxide semiconductor layer, and the bottom surface of the contact hole 5424 is removed. Note that this embodiment is not limited thereto, and nitrogen, helium, or the like can be used instead of the argon atmosphere. Alternatively, the reverse sputtering can be performed in an atmosphere where oxygen, hydrogen, $N_2O$, or the like is added to the argon atmosphere or in an atmosphere where $Cl_2$, $CF_4$, or the like is added to the argon atmosphere.

Note that at the time of etching the second conductive layer, part of the oxide semiconductor layer is also etched, so that an oxide semiconductor layer 5425 is formed. By this etching, part of the oxide semiconductor layer 5425, which overlaps with the conductive layer 5421, or part of the oxide semiconductor layer 5425, over which the second conductive layer is not formed, is etched to be thinned in many cases. Note that this embodiment is not limited thereto, and it is possible not to etch the oxide semiconductor layer. However, in the case where the $n^+$ layer is formed over the oxide semiconductor layer, the oxide semiconductor layer is often etched. After that, the resist mask is removed. The transistor 5441 and the capacitor 5442 are completed when this etching is finished. A cross-sectional view of the steps so far corresponds to FIG. 16B.

Here, when the reverse sputtering is performed before the second conductive layer is formed by a sputtering method, the thickness of an exposed portion of the insulating layer 5423 is reduced by preferably approximately 2 nm to 10 nm in some cases. Accordingly, a recessed portion is sometimes formed in the insulating layer 5423. Alternatively, by performing the reverse sputtering after the second conductive layer is etched to form the conductive layers 5429, 5430, and 5431, end portions of the conductive layers 5429, 5430, and 5431 are curved in some cases as illustrated in FIG. 16B.

Next, heat treatment is performed at 200° C. to 600° C. in an air atmosphere or a nitrogen atmosphere. Through this heat treatment, rearrangement at the atomic level occurs in the In—Ga—Zn—O-based non-single-crystal layer. This heat treatment (including optical annealing) is important because strain energy which inhibits carrier movement is released by the heat treatment. Note that there is no particular limitation on the timing at which the heat treatment is performed, and the heat treatment can be performed at any time after the oxide semiconductor layer is formed.

Then, an insulating layer 5432 is formed over the entire surface. The insulating layer 5432 can have a single-layer structure or a layered structure. For example, when an organic insulating layer is used as the insulating layer 5432, the organic insulating layer is formed in such a manner that a composition which is a material for the organic insulating layer is applied and subjected to heat treatment at 200° C. to 600° C. in an air atmosphere or a nitrogen atmosphere. By forming the organic insulating layer in contact with the oxide semiconductor layer in such a manner, a thin film transistor with highly reliable electric characteristics can be manufactured. Note that when organic insulating layer is used as the insulating layer 5432, a silicon nitride film or a silicon oxide film can be provided below the organic insulating layer.

FIG. 16C illustrates a mode in which the insulating layer 5432 is formed using a non-photosensitive resin, so that an end portion of the insulating layer 5432 is angular in the cross section of a region where the contact hole is formed. However, when the insulating layer 5432 is formed using a photosensitive resin, the end portion of the insulating layer 5432 can be curved in the cross section of the region where the contact hole is formed. Thus, the coverage of a third conductive layer or a pixel electrode which is formed later is increased.

Note that instead of application of the composition, the following method can be used depending on the material: dip coating, spray coating, an ink-jet method, a printing method, a doctor knife, a roll coater, a curtain coater, a knife coater, or the like.

Note that without performing the heat treatment after the oxide semiconductor layer is formed, the heat treatment for the composition, which is the material for the organic insulating layer, can also serve to heat the oxide semiconductor layer.

The insulating layer 5432 can be formed to a thickness of 200 nm to 5 μm, preferably 300 nm to 1 μm.

Next, the third conductive layer is formed over the entire surface. Then, the third conductive layer is selectively etched by using a resist mask formed through a photolithography process using a fifth photomask, so that a conductive layer 5433 and a conductive layer 5434 are formed. A cross-sectional view of the steps so far corresponds to FIG. 16C. Each of the conductive layers 5433 and 5434 can function as a wiring, a pixel electrode, a reflective electrode, a transparent electrode, or the electrode of the capacitor. In particular, since the conductive layer 5434 is connected to the conductive layer 5422, it can function as the electrode of the capacitor 5442. Note that this embodiment is not limited thereto, and the conductive layers 5433 and 5434 can have a function of connecting the first conductive layer and the second conductive layer. For example, by connecting the conductive layers 5433 and 5434 to each other, the conductive layer 5422 and the conductive layer 5430 can be connected through the third conductive layer (the conductive layers 5433 and 5434).

Since the capacitor 5442 has a structure where the conductive layer 5431 is sandwiched between the conductive layers 5422 and 5434, the capacitance value of the capacitor 5442 can be increased. Note that this embodiment is not limited thereto, and one of the conductive layers 5422 and 5434 can be eliminated.

Note that after the resist mask is removed by wet etching, it is possible to perform heat treatment at 200° C. to 600° C. in an air atmosphere or a nitrogen atmosphere.

Through the above steps, the transistor 5441 and the capacitor 5442 can be manufactured.

Note that as illustrated in FIG. 16D, an insulating layer 5435 can be formed over the oxide semiconductor layer 5425. The insulating layer 5435 has a function of preventing the oxide semiconductor layer from being etched when the second conductive layer is patterned, and functions as a channel stop film. Accordingly, the thickness of the oxide semiconductor layer can be reduced, so that reduction in driving voltage, reduction in off-state current, increase in the on/off ratio of drain current, improvement in subthreshold swing (S value), or the like of the transistor can be achieved. The insulating layer 5435 can be formed in such a manner that an oxide semiconductor layer and an insulating layer are successively formed over the entire surface, and then, the insulating layer is selectively patterned using a resist mask formed through a photolithography process using a photomask. After that, the second conductive layer is formed over the entire surface, and the oxide semiconductor layer is patterned at the same time as the second conductive layer. That is, the oxide semiconductor layer and the second conductive layer can be patterned using the same mask (reticle). In that case, the oxide semiconductor layer is always placed below the second conductive layer. In such a manner, the insulating layer 5435 can be formed without increase in the number of steps. The oxide semiconductor layer is often formed below the second conductive layer in such a manufacturing process. However, this embodiment is not limited thereto. The insulating layer 5435 can be formed in such a manner that after an oxide semiconductor layer is patterned, an insulating layer is formed over the entire surface and is patterned.

In FIG. 16D, the capacitor 5442 has a structure where the insulating layer 5423 and an oxide semiconductor layer 5436 are sandwiched between the conductive layers 5422 and 5431. Note that the oxide semiconductor layer 5436 can be eliminated. Moreover, the conductive layers 5430 and 5431 are connected through a conductive layer 5437 which is formed by patterning the third conductive layer. Such a structure can be used for a pixel of a liquid crystal display device, for example. For example, the transistor 5441 can function as a switching transistor, and the capacitor 5442 can function as a storage capacitor. Moreover, the conductive layers 5421, 5422, 5429, and 5437 can function as a gate line, a capacitor line, a source line, and a pixel electrode, respectively. Note that this embodiment is not limited thereto. In addition, as in FIG. 16D, the conductive layer 5430 and the conductive layer 5431 can be connected through the third conductive layer in FIG. 16C.

Note that as illustrated in FIG. 16E, the oxide semiconductor layer 5425 can be formed after the second conductive layer is patterned. Accordingly, the oxide semiconductor layer is not yet formed when the second conductive layer is patterned, so that the oxide semiconductor layer is not etched. Thus, the thickness of the oxide semiconductor layer can be reduced, so that reduction in driving voltage, reduction in off-state current, increase in the on/off ratio of drain current, improvement in S value, or the like of the transistor can be achieved. Note that the oxide semiconductor layer 5425 can be formed in such a manner that after the second conductive layer is patterned, an oxide semiconductor layer is formed over the entire surface and selectively patterned using a resist mask formed through a photolithography process using a photomask.

In FIG. 16E, the capacitor has a structure where the insulating layers 5423 and 5432 are sandwiched between the conductive layer 5422 and a conductive layer 5439 which is formed by patterning the third conductive layer. Moreover, the conductive layers 5422 and 5430 are connected through a conductive layer 5438 which is formed by patterning the third conductive layer. Further, the conductive layer 5439 is connected to a conductive layer 5440 which is formed by patterning the second conductive layer. In addition, as in FIG. 16E, the conductive layers 5430 and 5422 can be connected through the conductive layer 5438 in FIGS. 16C and 16D.

A complete depletion state can be obtained by making the thickness of the oxide semiconductor layer (or a channel layer) smaller than that of a depletion layer formed in the case where the transistor is off. Accordingly, the off-state current can be reduced. In order to realize this, the thickness of the oxide semiconductor layer is preferably 20 nm or less, more preferably 10 nm or less, and further preferably 6 nm or less.

Note that in order to realize reduction in operation voltage, reduction in off-state current, increase in the on/off ratio of drain current, improvement in S value, or the like of the transistor, the thickness of the oxide semiconductor layer is preferably the smallest among those of the layers included in the transistor. For example, the thickness of the oxide semiconductor layer is preferably smaller than that of the insulating layer 5423. More preferably, the thickness of the oxide semiconductor layer is half or less, further preferably ⅕ or less, and still preferably 1/10 or less than the thickness of the insulating layer 5423. Note that this embodiment is not limited thereto, and the thickness of the oxide semiconductor layer can be larger than that of the insulating layer 5423 in order to improve the reliability. Since the thickness of the oxide semiconductor layer is preferably larger particularly in the case where the oxide semiconductor layer is etched as in FIG. 16C, it is possible to make the thickness of the oxide semiconductor layer larger than that of the insulating layer 5423.

Note that in order to increase the withstand voltage of the transistor, the thickness of the insulating layer 5423 is preferably larger, more preferably 5/4 or more, and further preferably 4/3 or more than the thickness of the first conductive layer. Note that this embodiment is not limited thereto, and the thickness of the insulating layer 5423 can be smaller than that of the first conductive layer in order to increase the mobility of the transistor.

Note that for the substrate, the insulating film, the conductive film, and the semiconductor layer in this embodiment, materials described in other embodiments or materials similar to those described in this specification can be used.

Note that in this embodiment, what is illustrated in the drawing can be freely combined with or replaced with what is described in other embodiments as appropriate.

Embodiment 8

In this embodiment, examples of structures of transistors will be described with reference to FIGS. 17A to 17C.

Figure 17A:
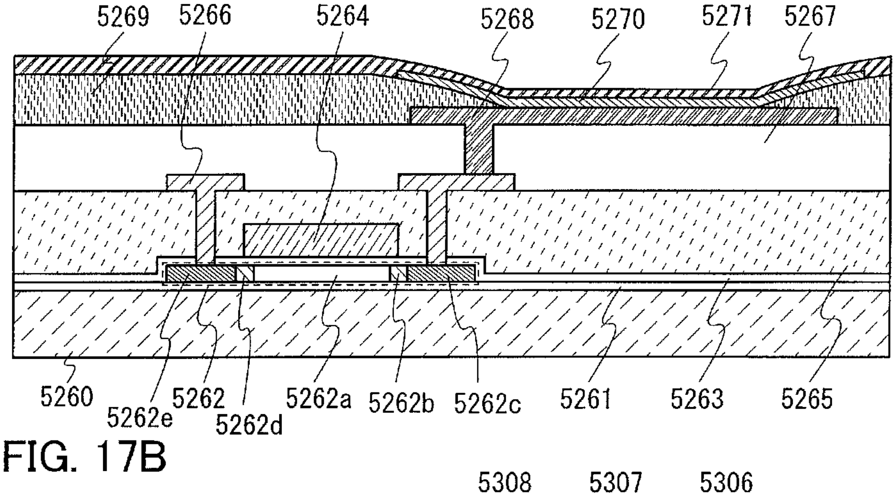
FIGS. 17A to 17C are cross sectional views each illustrating a transistor shown in an embodiment.

FIG. 17A illustrates an example of a structure of a top-gate transistor. FIG. 17B illustrates an example of a structure of a bottom-gate transistor. FIG. 17C illustrates an example of a structure of a transistor formed using a semiconductor substrate.

FIG. 17A illustrates a substrate 5260; an insulating layer 5261 formed over the substrate 5260; a semiconductor layer 5262 which is formed over the insulating layer 5261 and includes a region **5262*a*, a region 5262*b*, a region 5262*c*, a region 5262*d*, and a region 5262*e*; an insulating layer 5263 formed so as to cover the semiconductor layer 5262; a conductive layer 5264 formed over the semiconductor layer 5262 and the insulating layer 5263; an insulating layer 5265 which is formed over the insulating layer 5263 and the conductive layer 5264 and is provided with opening portions; a conductive layer 5266 which is formed over the insulating layer 5265 and in the opening portions formed in the insulating layer 5265; an insulating layer 5267 which is formed over the conductive layer 5266 and the insulating layer 5265 and is provided with an opening portion; a conductive layer 5268 which is formed over the insulating layer 5267 and in the opening portion formed in the insulating layer 5267; an insulating layer 5269 which is formed over the insulating layer 5267 and the conductive layer 5268 and is provided with an opening portion; a light-emitting layer 5270 formed over the insulating layer 5269 and in the opening portion formed in the insulating layer 5269; and a conductive layer 5271 formed over the insulating layer 5269 and the light-emitting layer 5270**.

Figure 17B:
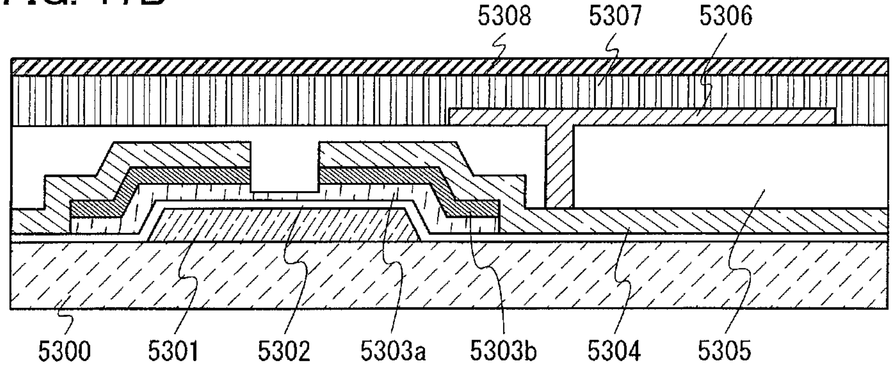

FIG. 17B illustrates a substrate 5300; a conductive layer 5301 formed over the substrate 5300; an insulating layer 5302 formed so as to cover the conductive layer 5301; a semiconductor layer **5303*a* formed over the conductive layer 5301 and the insulating layer 5302; a semiconductor layer 5303*b* formed over the semiconductor layer 5303*a*; a conductive layer 5304 formed over the semiconductor layer 5303*b* and the insulating layer 5302; an insulating layer 5305 which is formed over the insulating layer 5302 and the conductive layer 5304 and is provided with an opening portion; a conductive layer 5306 formed over the insulating layer 5305 and in the opening portion formed in the insulating layer 5305; a liquid crystal layer 5307** provided over the insulating layer

5305 and the conductive layer 5306; and a conductive layer 5308 formed over the liquid crystal layer 5307.

Figure 17C:
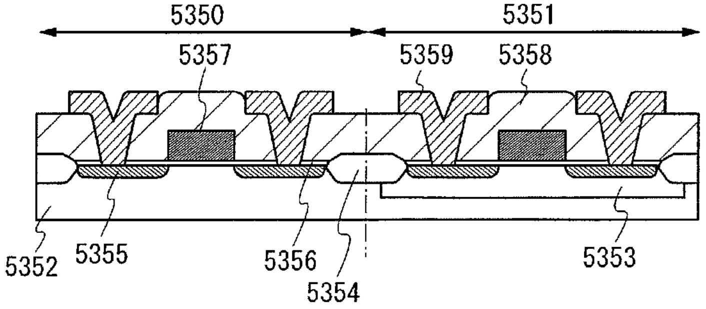

FIG. 17C illustrates a semiconductor substrate 5352 including a region 5353 and a region 5355; an insulating layer 5356 formed on the semiconductor substrate 5352; an insulating layer 5354 formed on the semiconductor substrate 5352; a conductive layer 5357 formed over the insulating layer 5356; an insulating layer 5358 which is formed over the insulating layer 5354, the insulating layer 5356, and the conductive layer 5357 and is provided with opening portions; and a conductive layer 5359 formed over the insulating layer 5358 and in the opening portions formed in the insulating layer 5358. Accordingly, a transistor is formed in each of a region 5350 and a region 5351.

The insulating layer 5261 can function as a base film. The insulating layer 5354 functions as an element isolation layer (e.g., a field oxide film). Each of the insulating layer 5263, the insulating layer 5302, and the insulating layer 5356 can function as a gate insulating film. Each of the conductive layer 5264, the conductive layer 5301, and the conductive layer 5357 can function as a gate electrode. Each of the insulating layer 5265, the insulating layer 5267, the insulating layer 5305, and the insulating layer 5358 can function as an interlayer film or a planarization film. Each of the conductive layer 5266, the conductive layer 5304, and the conductive layer 5359 can function as a wiring, an electrode of a transistor, an electrode of a capacitor, or the like. Each of the conductive layer 5268 and the conductive layer 5306 can function as a pixel electrode, a reflective electrode, or the like. The insulating layer 5269 can function as a bank. Each of the conductive layer 5271 and the conductive layer 5308 can function as a counter electrode, a common electrode, or the like.

As each of the substrate 5260 and the substrate 5300, a glass substrate, a quartz substrate, a single crystal substrate (e.g., a silicon substrate), an SOI substrate, a plastic substrate, a metal substrate, a stainless steel substrate, a substrate including a stainless steel foil, a tungsten substrate, a substrate including a tungsten foil, or a flexible substrate can be used, for example. Examples of the glass substrate are barium borosilicate glass and aluminoborosilicate glass. Examples of the flexible substrate are flexible synthetic resin such as plastics typified by polyethylene terephthalate (PET), polyethylene naphthalate (PEN), and polyethersulfone (PES), and acrylic. Alternatively, an attachment film (formed using polypropylene, polyester, vinyl, polyvinyl fluoride, polyvinyl chloride, or the like), paper including a fibrous material, a base material film (polyester, polyamide, polyimide, an inorganic vapor deposition film, paper, or the like), or the like can be used.

As the semiconductor substrate 5352, a single crystal silicon substrate having n-type or p-type conductivity can be used, for example. Note that this embodiment is not limited thereto, and a substrate which is similar to the substrate 5260 can be used. As an example, the region 5353 is a region where an impurity is added to the semiconductor substrate 5352, and functions as a well. For example, in the case where the semiconductor substrate 5352 has p-type conductivity, the region 5353 has n-type conductivity and functions as an n-well. On the other hand, in the case where the semiconductor substrate 5352 has n-type conductivity, the region 5353 has p-type conductivity and functions as a p-well. As an example, the region 5355 is a region where an impurity is added to the semiconductor substrate 5352, and functions as a source region or a drain region. Note that an LDD region can be formed in the semiconductor substrate 5352.

For the insulating layer 5261, a single-layer structure or a layered structure of an insulating film containing oxygen or nitrogen, such as a silicon oxide ($SiO_x$) film, a silicon nitride ($SiN_x$) film, a silicon oxynitride ($SiO_xN_y$) (x>y) film, or a silicon nitride oxide ($SiN_xO_y$) (x>y) film can be used, for example. In the case where the insulating layer 5261 has a two-layer structure, a silicon nitride film and a silicon oxide film can be formed as a first insulating layer and a second insulating layer, respectively, for example. In the case where the insulating layer 5261 has a three-layer structure, a silicon oxide film, a silicon nitride film, and a silicon oxide film can be formed as a first insulating layer, a second insulating layer, and a third insulating layer, respectively, for example.

For the semiconductor layer 5262, the semiconductor layer 5303*a*, and the semiconductor layer 5303*b*, a non-single-crystal semiconductor (e.g., amorphous silicon, polycrystalline silicon, or microcrystalline silicon), a single crystal semiconductor, a compound semiconductor or an oxide semiconductor (e.g., ZnO, InGaZnO, SiGe, GaAs, IZO, ITO, SnO, TiO, or AlZnSnO (AZTO)), an organic semiconductor, or a carbon nanotube can be used, for example.

For example, the region 5262*a* is an intrinsic region where an impurity is not added to the semiconductor layer 5262, and functions as a channel region. However, a slight amount of impurities can be added to the region 5262*a*. The concentration of the impurity added to the region 5262*a* is preferably lower than the concentration of an impurity added to the region 5262*b*, the region 5262*c*, the region 5262*d*, or the region 5262*e*. Each of the region 5262*b* and the region 5262*d* is a region to which an impurity is added at low concentration, and functions as an LDD (lightly doped drain) region. Note that the region 5262*b* and the region 5262*d* can be eliminated. Each of the region 5262*c* and the region 5262*e* is a region to which an impurity is added at high concentration, and functions as a source region or a drain region.

Note that the semiconductor layer 5303*b* is a semiconductor layer to which phosphorus or the like is added as an impurity element, and has n-type conductivity.

Note that when an oxide semiconductor or a compound semiconductor is used for the semiconductor layer 5303*a*, the semiconductor layer 5303*b* can be eliminated.

For each of the insulating layer 5263, the insulating layer 5273, and the insulating layer 5356, a single-layer structure or a layered structure of an insulating film containing oxygen or nitrogen, such as a silicon oxide ($SiO_x$) film, a silicon nitride ($SiN_x$) film, a silicon oxynitride ($SiO_xN_y$) (x>y) film, or a silicon nitride oxide ($SiN_xO_y$) (x>y) film can be used, for example.

As each of the conductive layer 5264, the conductive layer 5266, the conductive layer 5268, the conductive layer 5271, the conductive layer 5301, the conductive layer 5304, the conductive layer 5306, the conductive layer 5308, the conductive layer 5357, and the conductive layer 5359, a conductive film having a single-layer structure or a layered structure can be used, for example. For the conductive film, a single-layer film containing one element selected from the group consisting of aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), manganese (Mn), cobalt (Co), niobium (Nb), silicon (Si), iron (Fe), palladium (Pd), carbon (C), scandium (Sc), zinc (Zn), phosphorus (P), boron (B), arsenic (As), gallium (Ga), indium (In), tin (Sn), oxygen (O), zirconium (Zr), and cerium (Ce); or a compound containing one or more elements selected from the above group can be used, for example. Examples of the compound are an alloy containing one or more elements selected from the above group (e.g., an alloy material such as indium tin oxide (ITO), indium zinc oxide (IZO), indium tin oxide containing silicon oxide (ITSO), zinc oxide (ZnO), tin oxide (SnO), cadmium tin oxide (CTO), aluminum-neodymium (Al—Nd), aluminum-tungsten (Al—W), aluminum-zirconium (Al—Zr), aluminum-titanium (Al—Ti), aluminum-cerium (Al—Ce), magnesium-silver (Mg—Ag), molybdenum-niobium (Mo—Nb), molybdenum-tungsten (Mo—W), or molybdenum-tantalum (Mo—Ta)); a compound containing nitrogen and one or more elements selected from the above group (e.g., a nitride film containing titanium nitride, tantalum nitride, or molybdenum nitride); and a compound containing silicon and one or more elements selected from the above group (e.g., a silicide film containing tungsten silicide, titanium silicide, nickel silicide, aluminum silicon, or molybdenum silicon). Alternatively, a nanotube material such as a carbon nanotube, an organic nanotube, an inorganic nanotube, or a metal nanotube can be used.

Note that silicon (Si) can contain an n-type impurity (e.g., phosphorus) or a p-type impurity (e.g., boron). When silicon contains the impurity, increase in conductivity or a function similar to a general conductor can be realized. Accordingly, such silicon can be utilized easily as a wiring, an electrode, or the like.

Note that as silicon, silicon with various levels of crystallinity, such as single crystal silicon, polycrystalline silicon (polysilicon), or microcrystalline (microcrystal) silicon; or silicon without crystallinity, such as amorphous silicon, can be used. By using single crystal silicon or polycrystalline silicon as silicon, the resistance of a wiring, an electrode, a conductive layer, a conductive film, a terminal, or the like can be reduced. By using amorphous silicon or microcrystalline silicon as silicon, a wiring or the like can be formed through a simple process.

Note that when a semiconductor material such as silicon is used for the conductive layer, the semiconductor material such as silicon can be formed at the same time as a semiconductor layer of a transistor.

Aluminum and silver have high conductivity, so that signal delay can be reduced. Moreover, since aluminum and silver can be easily etched, they are easily patterned and can be minutely processed.

Copper has high conductivity, so that signal delay can be reduced. When copper is used for the conductive layer, a layered structure is preferably employed in order to improve adhesion.

Molybdenum and titanium are preferable because of the following reasons: molybdenum and titanium are not likely to cause defects even if they are in contact with an oxide semiconductor (e.g., ITO or IZO) or silicon; and molybdenum and titanium are easily etched and have high heat resistance. Accordingly, molybdenum or titanium is preferably used for a conductive layer which is in contact with an oxide semiconductor or silicon.

Tungsten is preferable because it has advantages such as high heat resistance.

Neodymium is preferable because it has advantages such as high heat resistance. In particular, when an alloy material of neodymium and aluminum is used for the conductive layer, aluminum hardly causes hillocks. Note that this embodiment is not limited thereto, and hillocks are hardly generated in aluminum when an alloy material of aluminum and tantalum, zirconium, titanium, or cerium is used. In particular, an alloy material of aluminum and cerium can drastically reduce arcing.

Since ITO, IZO, ITSO, ZnO, Si, SnO, CTO, a carbon nanotube, or the like has light-transmitting properties, such a material can be used for a portion through which light passes, such as a pixel electrode, a counter electrode, or a common electrode. In particular, IZO is preferable because it is easily etched and processed. In etching IZO, residues are hardly left. Accordingly, when IZO is used for a pixel electrode, defects (e.g., short circuit or orientation disorder) of a liquid crystal element or a light-emitting element can be reduced.

Note that a conductive layer can have a single-layer structure or a multi-layer structure. When a single-layer structure is employed, a process for manufacturing a wiring, an electrode, a conductive layer, a conductive film, a terminal, or the like can be simplified, the number of days for a process can be reduced, and costs can be reduced. On the other hand, when a multi-layer structure is employed, a wiring, an electrode, or the like with high quality can be formed while an advantage of each material is utilized and a disadvantage thereof is reduced. For example, when a low-resistant material (e.g., aluminum) is included in a multi-layer structure, reduction in resistance of a wiring can be realized. As another example, when a layered structure is employed in which a low heat-resistant material is sandwiched between high heat-resistant materials, heat resistance of a wiring, an electrode, or the like can be increased while advantages of the low heat-resistance material are utilized. As an example of such a layered structure, it is preferable to employ a layered structure in which a layer containing aluminum is sandwiched between layers containing molybdenum, titanium, neodymium, or the like.

When wirings, electrodes, or the like are in direct contact with each other, they adversely affect each other in some cases. For example, in some cases, one wiring or one electrode is mixed into a material of another wiring or another electrode and changes its properties, whereby an intended function cannot be obtained. As another example, when a high-resistant portion is formed, a problem may occur so that the portion cannot be normally formed. In such cases, a material whose properties are changed by reaction with a different material can be sandwiched between or covered with materials which do not easily react with the different material. For example, when ITO and aluminum are connected to each other, titanium, molybdenum, an alloy of neodymium, or the like can be sandwiched between ITO and aluminum. For example, when silicon and aluminum are connected to each other, titanium, molybdenum, or an alloy of neodymium can be sandwiched between silicon and aluminum. Note that such a material can be used for a wiring, an electrode, a conductive layer, a conductive film, a terminal, a via, a plug, or the like.

For each of the insulating layer 5265, the insulating layer 5267, the insulating layer 5269, the insulating layer 5305, and the insulating layer 5358, an insulating layer having a single-layer structure or a layered structure can be used, for example. As the insulating layer, a film containing oxygen or nitrogen, such as a silicon oxide ($SiO_x$) film, a silicon nitride ($SiN_x$) film, a silicon oxynitride ($SiO_xN_y$) (x>y) film, or a silicon nitride oxide ($SiN_xO_y$) (x>y) film; a film containing carbon such as diamond-like carbon (DLC); an organic material such as a siloxane resin, epoxy, polyimide, polyamide, polyvinyl phenol, benzocyclobutene, or acrylic; or the like can be used, for example.

For the light-emitting layer 5270, an organic EL element or an inorganic EL element can be used, for example. As an example, the organic EL element can have a single-layer structure or a layered structure of a hole injection layer formed using a hole injection material, a hole transport layer formed using a hole transport material, a light-emitting layer formed using a light-emitting material, an electron transport layer formed using an electron transport material, an electron injection layer formed using an electron injection material, or a layer in which a plurality ofse materials are mixed.

The following liquid crystal can be used for the liquid crystal layer 5307: nematic liquid crystal, cholesteric liquid crystal, smectic liquid crystal, discotic liquid crystal, thermotropic liquid crystal, lyotropic liquid crystal, low molecular liquid crystal, high molecular liquid crystal, polymer dispersed liquid crystal (PDLC), ferroelectric liquid crystal, anti-ferroelectric liquid crystal, main chain type liquid crystal, side chain type polymer liquid crystal, plasma addressed liquid crystal (PALC), and banana-shaped liquid crystal. Moreover, the following methods can be used for driving the liquid crystal, for example: a TN (twisted nematic) mode, an STN (super twisted nematic) mode, an IPS (in-plane-switching) mode, an FFS (fringe field switching) mode, an MVA (multi-domain vertical alignment) mode, a PVA (patterned vertical alignment) mode, an ASV (advanced super view) mode, an ASM (axially symmetric aligned microcell) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a guest-host mode, and a blue phase mode.

Note that an insulating layer which functions as an alignment film, an insulating layer which functions as a protrusion portion, or the like can be formed over the insulating layer 5305 and the conductive layer 5306.

Note that a color filter, a black matrix, an insulating layer which functions as a protrusion portion, or the like can be formed over the conductive layer 5308. An insulating layer which functions as an alignment film can be formed below the conductive layer 5308.

Note that in the cross-sectional structure in FIG. 17A, the insulating layer 5269, the light-emitting layer 5270, and the conductive layer 5271 can be eliminated, and the liquid crystal layer 5307 and the conductive layer 5308 which are illustrated in FIG. 17B can be formed over the insulating layer 5267 and the conductive layer 5268.

Note that in the cross-sectional structure in FIG. 17B, the liquid crystal layer 5307 and the conductive layer 5308 are eliminated, and the insulating layer 5269, the light-emitting layer 5270, and the conductive layer 5271 which are illustrated in FIG. 17A can be formed over the insulating layer 5305 and the conductive layer 5306.

Note that in the cross-sectional structure in FIG. 17C, the insulating layer 5269, the light-emitting layer 5270, and the conductive layer 5271 which are illustrated in FIG. 17A can be formed over the insulating layer 5305 and the conductive layer 5306. Alternatively, the liquid crystal layer 5307 and the conductive layer 5308 which are illustrated in FIG. 17B can be formed over the insulating layer 5358 and the conductive layer 5359.

Note that in this embodiment, what is illustrated in the drawing can be freely combined with or replaced with what is described in other embodiments as appropriate.

Embodiment 9

In this embodiment, examples of electronic devices will be described.

FIGS. 18A to 18H and FIGS. 19A to 19D illustrate electronic devices. These electronic devices can each include a housing 9630, a display portion 9631, a speaker 9633, an LED lamp 9634, an operation key 9635, a connecting terminal 9636, a sensor 9637 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 9638, and the like.

Figure 18A:
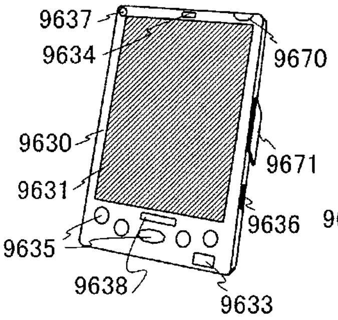
FIGS. 18A to 18H are diagrams each illustrating electronic devices shown in an embodiment.
Figure 18B:
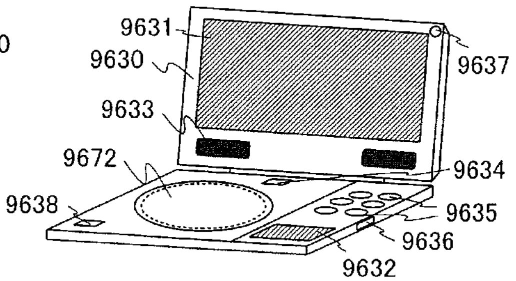
Figure 18C:
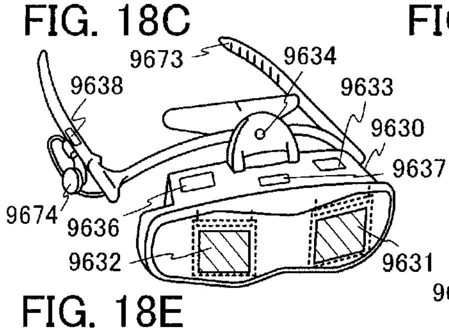
Figure 18D:
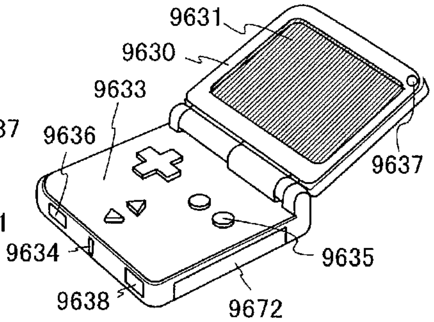
Figure 18E:
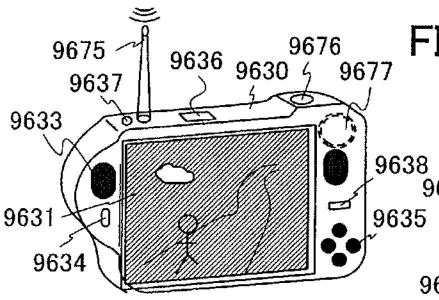
Figure 18F:
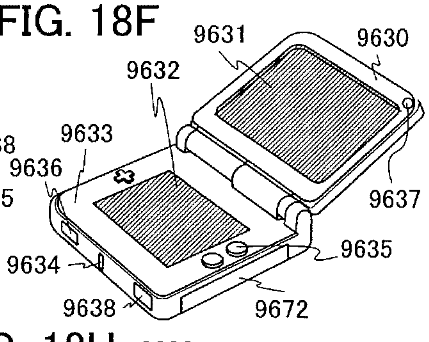
Figure 18G:
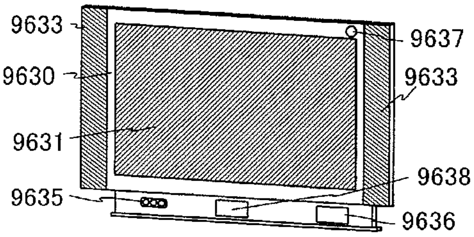
Figure 18H:
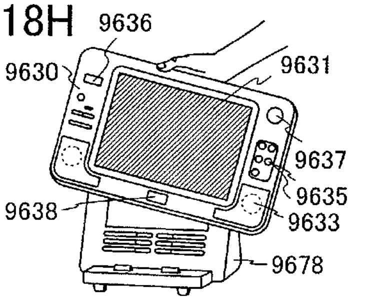
Figure 19A:
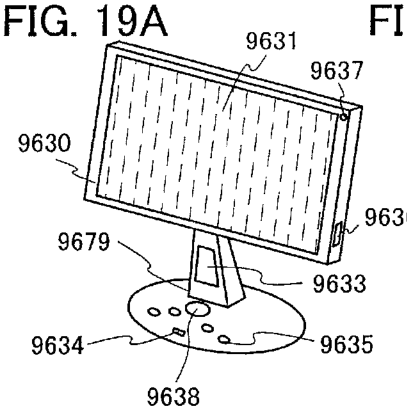
FIGS. 19A to 19H are diagrams each illustrating electronic devices shown in an embodiment.
Figure 19B:
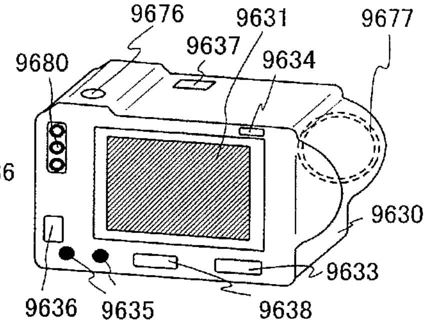
Figure 19C:
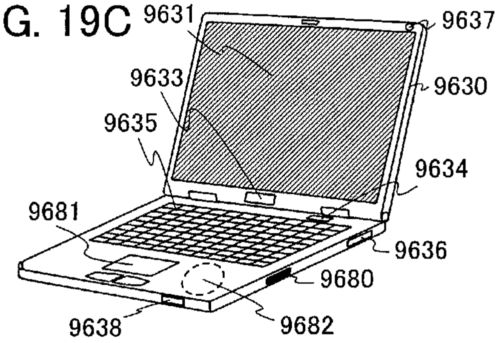
Figure 19D:
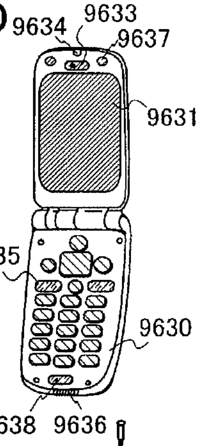

FIG. 18A illustrates a mobile computer which can include a switch 9670, an infrared port 9671, and the like in addition to the above objects. FIG. 18B illustrates a portable image reproducing device (e.g., a DVD reproducing device) provided with a memory medium, and the image reproducing device can include a second display portion 9632, a memory medium reading portion 9672, and the like in addition to the above objects. FIG. 18C illustrates a goggle-type display which can include the second display portion 9632, a supporting portion 9673, an earphone 9674, and the like in addition to the above objects. FIG. 18D illustrates a portable game machine which can include the memory medium reading portion 9672 and the like in addition to the above objects. FIG. 18E illustrates a digital camera having a television reception function, which can include an antenna 9675, a shutter button 9676, an image receiving portion 9677, and the like in addition to the above objects. FIG. 18F illustrates a portable game machine which can include the second display portion 9632, the memory medium reading portion 9672, and the like in addition to the above objects. FIG. 18G illustrates a television receiver which can include a tuner, an image processing portion, and the like in addition to the above objects. FIG. 18H illustrates a portable television receiver which can include charger 9678 that can transmit and receive signals and the like in addition to the above objects. FIG. 19A illustrates a display which can include a supporting board 9679 and the like in addition to the above objects. FIG. 19B illustrates a camera which can include an external connecting port 9680, the shutter button 9676, the image receiver portion 9677, and the like in addition to the above objects. FIG. 19C illustrates a computer which can include a pointing device 9681, the external connecting port 9680, a reader/writer 9682, and the like in addition to the above objects. FIG. 19D illustrates a mobile phone which can include a transmitting portion, a receiving portion, a tuner of one-segment partial reception service for mobile phones and mobile terminals ("1seg"), and the like in addition to the above objects.

The electronic devices illustrated in FIGS. 18A to 18H and FIGS. 19A to 19D can have a variety of functions, for example, a function of displaying various kinds of information (e.g., still images, moving images, and text images) on a display portion, a touch panel function, a function of displaying a calendar, date, time, and the like, a function of controlling processing with various kinds of software (programs), a wireless communication function, a function of being connected to a variety of computer networks with a wireless communication function, a function of transmitting and receiving various kinds of data with a wireless communication function, and a function of reading program or data stored in a memory medium and displaying the program or data on a display portion. Further, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiver portion can have a function of shooting a still image, a function of shooting a moving image, a function of automatically or manually correcting a shot image, a function of storing a shot image in a memory medium (an external memory medium or a memory medium incorporated in the camera), a function of displaying a shot image on the display portion, or the like. Note that functions which can be provided for the electronic devices illustrated in FIGS. 18A to 18H and FIGS. 19A to 19D are not limited to those described above, and the electronic devices can have a variety of functions.

The electronic devices described in this embodiment each include the display portion for displaying some sort of information. In the electronic device, influence of variation in characteristics of transistors is reduced in the display portion, whereby an extremely uniform image can be displayed.

Next, application examples of the semiconductor device will be described.

Figure 19E:
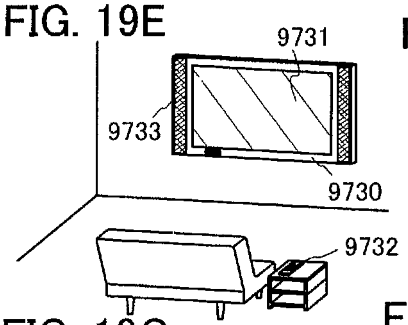

FIG. 19E illustrates an example in which the semiconductor device is provided so as to be integrated with a building. FIG. 19E illustrates a housing 9730, a display portion 9731, a remote controller device 9732 which is an operation portion, a speaker 9733, and the like. The semiconductor device is integrated with the building as a hung-on-wall type and can be provided without a large space.

Figure 19F:
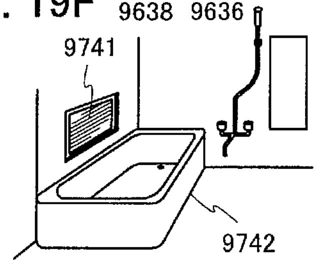

FIG. 19F illustrates another example in which the semiconductor device is provided so as to be integrated with a building. A display panel 9741 is integrated with a prefabricated bath 9742, so that a person who takes a bath can watch the display panel 9741.

Note that although this embodiment gives the wall and the prefabricated bath as examples of the building, this embodiment is not limited thereto and the semiconductor device can be provided in a variety of buildings.

Next, examples in which the semiconductor device is provided so as to be integrated with a moving body will be described.

Figure 19G:
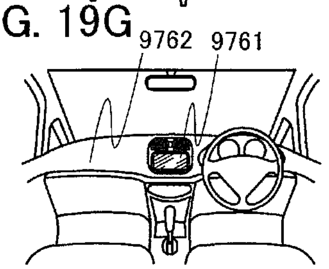

FIG. 19G illustrates an example in which the semiconductor device is provided in a vehicle. A display panel 9761 is provided in a body 9762 of the vehicle and can display information input from the operation of the body or the outside of the body on demand. Note that the display panel 9761 may have a navigation function.

Figure 19H:
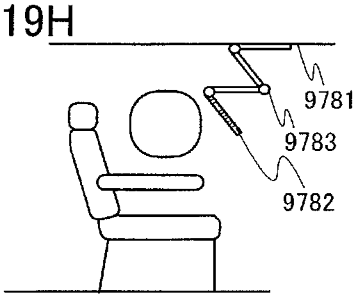

FIG. 19H illustrates an example in which the semiconductor device is provided so as to be integrated with a passenger airplane. FIG. 19H illustrates a usage pattern when a display panel 9782 is provided on a ceiling 9781 above a seat in the passenger airplane. The display panel 9782 is integrated with the ceiling 9781 through a hinge portion 9783, and a passenger can watch the display panel 9782 by extending and contracting the hinge portion 9783. The display panel 9782 has a function of displaying information when operated by the passenger.

Note that although this embodiment gives the body of the vehicle and the body of the plane as examples of the moving body, this embodiment is not limited thereto. The semiconductor device can be provided for a variety of moving bodies such as a two-wheeled motor vehicle, a four-wheeled vehicle (including a car, bus, and the like), a train (including a monorail, a railway, and the like), and a ship.

Note that in this embodiment, what is illustrated in the drawing can be freely combined with or replaced with what is described in other embodiments as appropriate.

This application is based on Japanese Patent Application serial no. 2009-045603 filed with Japan Patent Office on Feb. 27, 2009, the entire contents of which are hereby incorporated by reference.

What is claimed is:

1. A semiconductor device comprising:

a first transistor;

a second transistor;

a third transistor;

a fourth transistor;

a fifth transistor, a first capacitor; and a second capacitor, wherein a gate of the first transistor is electrically connected to a first electrode of the first capacitor, wherein one of a source and a drain of the second transistor is electrically connected to the gate of the first transistor, wherein the other of the source and the drain of the second transistor is electrically connected to one of a source and a drain of the first transistor, wherein one of a source and a drain of the third transistor is electrically connected to a second electrode of the first capacitor, wherein the other of the source and the drain of the first transistor is electrically connected to a second wiring, wherein a first electrode of the second capacitor is electrically connected to the second electrode of the first capacitor, wherein one of a source and a drain of the fourth transistor is electrically connected to the one of the second capacitor, wherein the other of the source and the drain of the fourth transistor is electrically connected to a first wiring, wherein one of a source and a drain of the fifth transistor is electrically connected to the one of the source and the drain of the first transistor, wherein the other of the source and the drain of the fifth transistor is electrically connected to a pixel electrode, and wherein the first transistor comprises a channel portion comprising an oxide semiconductor.

2. The semiconductor device according to claim 1, wherein a second electrode of the second capacitor is electrically connected to the second wiring.

3. The semiconductor device according to claim 1, wherein a second electrode of the second capacitor is electrically connected to a third wiring.

4. An electronic device comprising:

the semiconductor device according to claim 1; and an operation switch.

5. A semiconductor device comprising:

a transistor;

a first capacitor wherein a first electrode of the first capacitor is electrically connected to a gate of the transistor;

a second capacitor wherein a first electrode of the second capacitor is electrically connected to a second electrode of the first capacitor;

a first switch configured to connect through an electric contact between the gate of the transistor and one of a source and a drain of the transistor;

a second switch configured to connect through an electric contact between the other of the source and the drain of the transistor and the second electrode of the first capacitor;

a third switch configured to connect through an electric contact between a first wiring and the first electrode of the second capacitor;

a fourth switch configured to connect through an electric contact between a pixel electrode and the one of the source and the drain of the transistor, and wherein the transistor comprises a channel portion comprising an oxide semiconductor.

6. An electronic device comprising:

the semiconductor device according to claim 5; and an operation switch.

7. The semiconductor device according to claim 1, wherein the other of the source and the drain of the third transistor is electrically connected to the other of the source and the drain of the first transistor.

8. The semiconductor device according to claim 1, further comprising:

a sixth transistor, wherein one of a source and a drain of the sixth transistor is electrically connected to the gate of the first transistor.

9. The semiconductor device according to claim 1, further comprising:

a sixth transistor, wherein one of a source and a drain of the sixth transistor is electrically connected to the one of the source and the drain of the first transistor.

10. A semiconductor device comprising:

a first transistor;

a second transistor;

a third transistor;

a fourth transistor;

a fifth transistor, a sixth transistor; and a first capacitor, wherein a gate of the first transistor is electrically connected to a first electrode of the first capacitor, wherein one of a source and a drain of the second transistor is electrically connected to the gate of the first transistor, wherein the other of the source and the drain of the second transistor is electrically connected to one of a source and a drain of the first transistor, wherein one of a source and a drain of the third transistor is electrically connected to the other of the source and the drain of the first transistor, wherein one of a source and a drain of the fourth transistor is electrically connected to the other of the source and the drain of the first transistor, wherein the other of the source and the drain of the fourth transistor is electrically connected to a first wiring, wherein one of a source and a drain of the fifth transistor is electrically connected to the one of the source and the drain of the first transistor, and wherein the other of the source and the drain of the fifth transistor is electrically connected to a pixel electrode, and wherein one of a source and a drain of the sixth transistor is electrically connected to the gate of the first transistor.

11. The semiconductor device according to claim 10, wherein the other of the source and the drain of the third transistor is electrically connected to a second wiring.

12. The semiconductor device according to claim 11, wherein a second electrode of the first capacitor is electrically connected to the second wiring.

13. The semiconductor device according to claim 11, wherein the other of the source and the drain of the third transistor is electrically connected to the second wiring through a second capacitor.

14. The semiconductor device according to claim 12, wherein the second electrode of the first capacitor is electrically connected to the second wiring through a second capacitor.

15. The semiconductor device according to claim 10, wherein one of a source and a drain of the fourth transistor is electrically connected to the other of the source and the drain of the first transistor through the third transistor.

16. The semiconductor device according to claim 10, wherein the first transistor comprises a channel portion comprising an oxide semiconductor.

17. An electronic device comprising:

the semiconductor device according to claim 10; and an operation switch.

* * * * *